(12) United States Patent
Puri et al.

(10) Patent No.: US 9,973,757 B2
(45) Date of Patent: May 15, 2018

(54) CONTENT ADAPTIVE PREDICTIVE AND FUNCTIONALLY PREDICTIVE PICTURES WITH MODIFIED REFERENCES FOR NEXT GENERATION VIDEO CODING

(71) Applicant: Intel Corporation, Santa Clara, CA (US)

(72) Inventors: Atul Puri, Redmond, WA (US); Neelesh N. Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 14/379,403

(22) PCT Filed: Dec. 27, 2013

(86) PCT No.: PCT/US2013/078114
§ 371 (c)(1),
(2) Date: Aug. 18, 2014

(87) PCT Pub. No.: WO2014/120374
PCT Pub. Date: Aug. 7, 2014

(65) Prior Publication Data
US 2015/0036737 A1    Feb. 5, 2015

Related U.S. Application Data

(60) Provisional application No. 61/758,314, filed on Jan. 30, 2013.

(51) Int. Cl.
*H04N 19/503* (2014.01)
*H04N 19/137* (2014.01)
(Continued)

(52) U.S. Cl.
CPC .......... *H04N 19/13* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS 6,850,567 B1 * 2/2005 Frimout ............... G06T 1/0085
348/415.1
8,265,145 B1 * 9/2012 Pejhan ................ H04N 19/105
370/342
(Continued)

FOREIGN PATENT DOCUMENTS

CN    101263513    9/2008
JP    2012-517132 A    7/2012
(Continued)

OTHER PUBLICATIONS

International Search Report and Written Opinion received for PCT Patent Application No. PCT/US2013/078114, dated May 13, 2014, 21 pages.
(Continued)

*Primary Examiner* — Edemio Navas, Jr.
(74) *Attorney, Agent, or Firm* — Green, Howard & Mughal, LLP

(57) ABSTRACT

Techniques related to content adaptive predictive and functionally predictive pictures with modified references for next generation video coding are described.

20 Claims, 20 Drawing Sheets

(51) Int. Cl.
| | |
|---|---|
| H04N 19/182 | (2014.01) |
| H04N 19/13 | (2014.01) |
| H04N 19/105 | (2014.01) |
| H04N 19/124 | (2014.01) |
| H04N 19/513 | (2014.01) |
| H04N 19/167 | (2014.01) |
| H04N 19/169 | (2014.01) |
| H04N 19/17 | (2014.01) |
| H04N 19/186 | (2014.01) |
| H04N 19/122 | (2014.01) |
| H04N 19/176 | (2014.01) |
| H04N 19/61 | (2014.01) |
| H04N 19/91 | (2014.01) |
| H04N 19/63 | (2014.01) |
| H04N 19/119 | (2014.01) |
| H04N 19/96 | (2014.01) |
| H04N 19/12 | (2014.01) |
| H04N 19/136 | (2014.01) |
| H04N 19/139 | (2014.01) |
| H04N 19/159 | (2014.01) |
| H04N 19/184 | (2014.01) |
| H04N 19/192 | (2014.01) |
| H04N 19/573 | (2014.01) |
| H04N 19/59 | (2014.01) |
| H04N 19/117 | (2014.01) |
| H04N 19/82 | (2014.01) |
| H04N 19/517 | (2014.01) |
| H04N 19/523 | (2014.01) |
| H04N 19/53 | (2014.01) |
| H04N 19/577 | (2014.01) |
| H04N 19/196 | (2014.01) |
| H04N 19/126 | (2014.01) |
| H04N 19/31 | (2014.01) |
| H04N 19/40 | (2014.01) |
| H04N 19/14 | (2014.01) |
| H04N 19/172 | (2014.01) |
| H04N 19/593 | (2014.01) |
| H04N 19/44 | (2014.01) |

(52) U.S. Cl.
CPC .......... *H04N 19/119* (2014.11); *H04N 19/12* (2014.11); *H04N 19/122* (2014.11); *H04N 19/124* (2014.11); *H04N 19/126* (2014.11); *H04N 19/136* (2014.11); *H04N 19/139* (2014.11); *H04N 19/14* (2014.11); *H04N 19/159* (2014.11); *H04N 19/167* (2014.11); *H04N 19/17* (2014.11); *H04N 19/172* (2014.11); *H04N 19/176* (2014.11); *H04N 19/182* (2014.11); *H04N 19/184* (2014.11); *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/593* (2014.11); *H04N 19/61* (2014.11); *H04N 19/63* (2014.11); *H04N 19/82* (2014.11); *H04N 19/91* (2014.11); *H04N 19/96* (2014.11); *H04N 19/44* (2014.11)

(56) References Cited

U.S. PATENT DOCUMENTS

| | | | |
|---|---|---|---|
| 2004/0114684 A1 | 6/2004 | Karczewicz et al. | |
| 2004/0151248 A1 | 8/2004 | Satoshi et al. | |
| 2007/0263722 A1* | 11/2007 | Fukuzawa | H04N 19/159 375/240.12 |
| 2008/0115176 A1* | 5/2008 | Rodriguez | H04N 21/23424 725/89 |
| 2011/0294544 A1 | 12/2011 | Liang et al. | |
| 2012/0050474 A1* | 3/2012 | Segall | G06T 5/50 348/43 |
| 2012/0269275 A1* | 10/2012 | Hannuksela | H04N 13/0048 375/240.25 |
| 2013/0058397 A1* | 3/2013 | Song | H04N 19/105 375/240.02 |

FOREIGN PATENT DOCUMENTS

| | | | |
|---|---|---|---|
| KR | 10-0948714 B1 | 3/2010 | |
| KR | 0948714 | 3/2010 | |
| KR | 100948714 | 3/2010 | |
| KR | 10-2010-0042542 A | 4/2010 | |
| KR | 20110126544 | 11/2011 | |
| WO | WO 2005086493 A1 * | 9/2005 | ............. H04N 19/63 |
| WO | 2007011851 | 1/2007 | |
| WO | 2010/086393 A1 | 8/2010 | |
| WO | 2014/120374 A1 | 8/2014 | |

OTHER PUBLICATIONS

International Preliminary Report on Patentability for PCT Patent Application No. PCT/US2013/078114, dated Aug. 13, 2015, 9 pages.
Extended European Search Report dated Aug. 25, 2016, for EP Patent Application No. 13873470.2.
Office Action for Korean Patent Application No. 2015-7009347, dated Jun. 27, 2016.
Houqiang, L. et al., "Rate-distortion Optimized Reference Picture Management for High Efficiency Video Coding", IEEE Transactions on Circuits and Systems for Video Technology, IEEE Service Center, Piscataway, NJ, US, vol. 22, No. 12, Dec. 1, 2012, XP011487163, ISSN: 1051-8215.
Notice of Final Rejection dated Dec. 30, 2016 for Korean Patent Application No. 2015-7009347.
Non-Final Office Action dated May 16, 2017 for Chinese Patent Application No. 201380053523.6.
Second Office Action dated Jun. 1, 2017 for European Application No. 13873470.2.
Second Office Action dated Nov. 10, 2017 for Chinese Patent Application No. 201380053523.6.

* cited by examiner

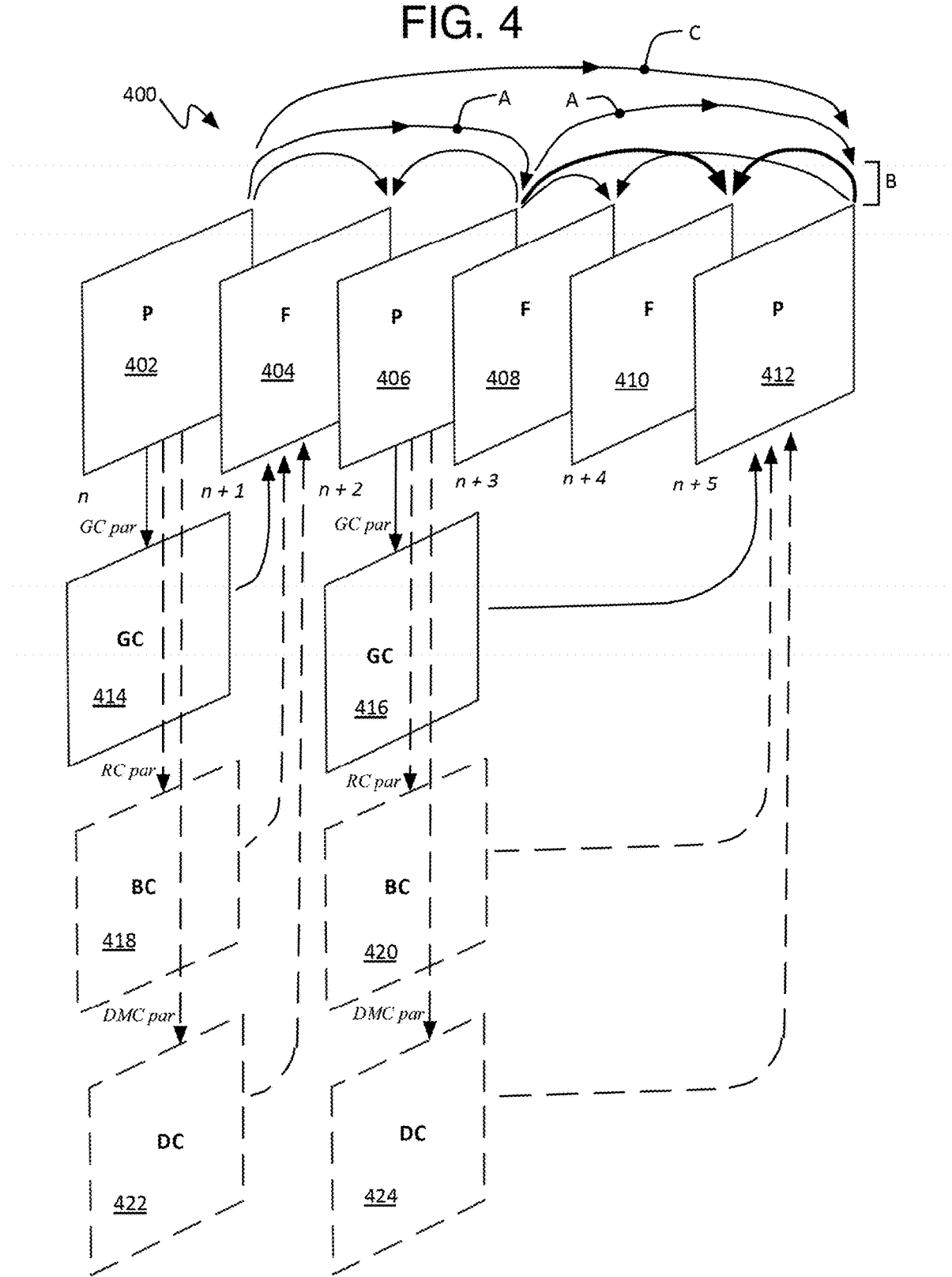

Receive data for a group of pictures comprising a sequence of frames of pixel data, the sequence having a display order, and wherein each frame is associated with a temporal position of the display order
602

Generate at least one current F-frame using inter-prediction, comprising providing the option to form at least one part of the current F-frame from a previous prediction reference frame, a subsequent prediction reference frame, or both, wherein previous and subsequent are relative to the position of the current F-frame and within the sequence
604

Generate motion data for the part of the at least one current F-frame comprising using at least one modified prediction reference frame for generating the motion data for the part of the current F-frame, and the at least one modified prediction reference frame being modified by using a morphing technique or a synthesizing technique or both
606

US 9,973,757 B2

CONTENT ADAPTIVE PREDICTIVE AND FUNCTIONALLY PREDICTIVE PICTURES WITH MODIFIED REFERENCES FOR NEXT GENERATION VIDEO CODING

RELATED APPLICATIONS

The present application claims the benefit of PCT Patent Application No. PCT/US2013/078114, filed on Dec. 27, 2013 titled as "CONTENT ADAPTIVE PREDICTIVE AND FUNCTIONALLY PREDICTIVE PICTURES WITH MODIFIED REFERENCES FOR NEXT GENERATION VIDEO CODING" and this application claims the benefit of U.S. Provisional Application No. 61/758,314 filed 30 Jan. 2013, and titled "NEXT GENERATION VIDEO CODING", which are incorporated herein for all purposes.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required, using existing video coding standards such as earlier MPEG standards and even the more recent H.264/AVC standard, is relatively high. H.264/AVC was not perceived to provide sufficiently high compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 is an illustrative diagram of a frame sequence with modified reference frames;

FIG. 6 is a flow chart showing a process to provide modified reference frames according to the implementations herein;

DETAILED DESCRIPTION

Figure 1:
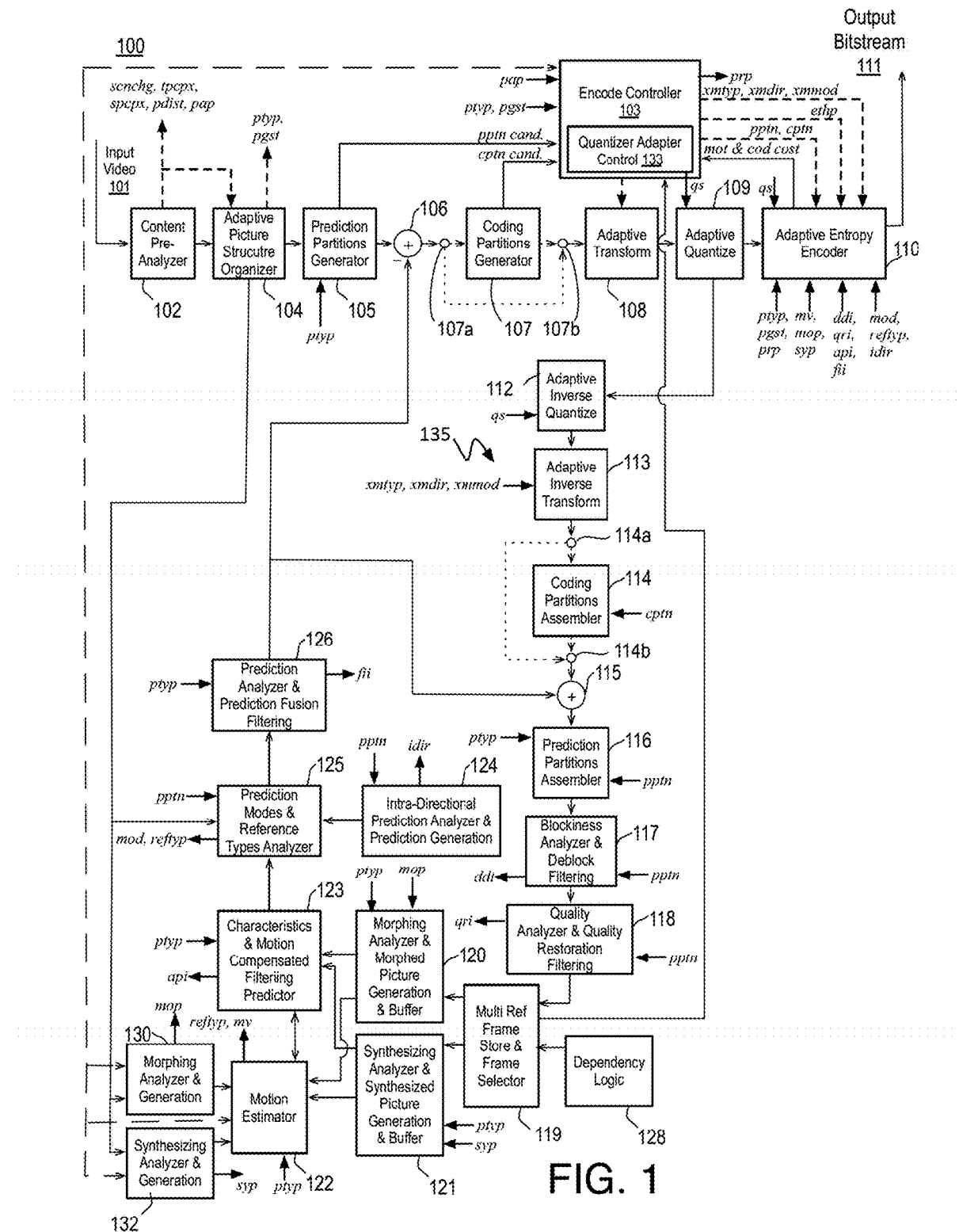
FIG. 1 is an illustrative diagram of an example next generation video encoder.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others. In another form, a non-transitory article, such as a non-transitory computer or machine readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below related to content adaptive predictive and functionally predictive pictures with modified references for next generation video coding.

As discussed above, the H.264/AVC standard may have a variety of limitations and ongoing attempts to improve on the standard, such as, for example, the HEVC standard may use iterative approaches to address such limitations. For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards may use expanded forms of traditional approaches to implicitly address the insufficient compression/quality problem, but often the results are limited. For example, traditional interframe coding typically includes motion compensated prediction used by the standards. Accordingly, such insufficient compression/quality problems are typically being implicitly addressed by only using local motion compensated prediction in interframe coding of video.

Further, some ad hoc approaches are currently being attempted. Such attempts typically may employ multiple past or multiple past and future frames. Such usage of multiple past or multiple past and future frames is typically employed with the hope that in the past or future frames, there might be some more similar areas to the area of a current frame being predicted than in the past frame (for P-pictures/slices), or in the past and future frames (for B-pictures/slices).

However, since many of such insufficient compression/quality problems are not only due to motion but other characteristics as well motion compensated prediction alone can't fully solve such insufficient compression/quality problems using predictions from previous reference frame (in case of P-pictures/slices), and previous and next reference frames in case of B-pictures/slices. Accordingly, next generation video (NGV) systems, apparatus, articles, and methods are described below. NGV video coding may incorporate significant content based adaptivity in the video coding process to achieve higher compression. Such implementations developed in the context of a NGV codec addresses the problem of how to improve the prediction signal which in turn allows achieving high compression efficiency in video coding.

More precisely, in this disclosure, we propose significant advances in traditional predictive P-pictures and bidirectionally predictive B-pictures, and picture structures in which they are employed, by developing improved versions of the same referred to in this disclosure as content adaptive predictive P-pictures, content adaptive functionally predictive F-pictures, and improved advanced picture structures that use these picture types.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (for example, Rs, Cs), variance, spatial complexity per picture, temporal complexity per picture (tpcpx), scene change detection, motion range estimation, gain detection, prediction distance estimation (pdist), number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104 (also referred to as the hierarchical picture group structure organizer). The adaptive organizer module 104 determines the picture group structure and the picture types of each picture in the group as well as reorder pictures in encoding order as needed. The adaptive organizer module 104 outputs control signals indicating the picture group structure and picture types (the abbreviations for the output/input controls shown on system 100 are recited below). The NGV coding described herein uses I-pictures (intra-coding), P-pictures (formed from inter-prediction from past/previous reference frames), and F-pictures (functional as described below), all of which are described in greater detail below. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 first may divide a frame or picture into tiles or super-fragments or the like (herein the terms frame, picture, and image may be used interchangeably except as otherwise noted and except that a frame is used to generally refer to a frame that is not necessarily assigned a specific picture type (I, P, F, or B-pictures for example)). In some examples, an additional module (for example, between modules 104 and 105) may be provided for dividing a frame into tiles or super-fragments or the like. By one example for NGV coding, a frame may be divided into tiles of 32×32 or 64×64 pixels where 64×64 is used for all standard definition and higher resolution video for coding of all picture types (I-, P-, or F-). For low resolution sequences, 64×64 is still used for coding of I- and F-pictures, while 32×32 is used for P-pictures.

By one example, prediction partitions generator module (which also may be referred to as Pred KdTree/BiTree Partitions Generator) 105 may then divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (for example, I-, P-, or F-picture) of individual video frames, a characteristic of the frame portion being partitioned, or the like. By one example, if a picture an I-picture is being coded, every tile, or almost all tiles, are further divided in into KdTree based partitions that can divide a space until a set minimum size is reached, and in one dimension at a time. The options for dividing the space may include no further division, division into two equal halves, division into two parts that are ¼ and ¾ of the space, or division into two parts that are ¾ and ¼ of the space. So, with I-pictures using 64×64 as the largest size (and allowing a minimum size of 4×4), a very large number of partitions of a tile can be generated if no other constraints are imposed. For example, one constraint is to set that the first pair of cuts are pre-decided for a 64×64 tile to halve the space in both the horizontal and vertical dimension so that four 32×32 sub-tiles are formed, and then sub-partitioning each 32×32 sub-tile by KdTree partitioning. Other restrictions are also possible to reduce the number of possible partition combinations.

These partitions of an I-picture tile are referred to as prediction partitions, as each tile partition may be used for spatial prediction (directional angular prediction or other types of prediction) and coding of prediction differences. Likewise, P-picture tiles can also be partitioned in this manner for prediction except that for lower resolutions, P-picture partitions start with a 32×32 tile, and KdTree based partitions are not used, but rather a simpler Bi-Tree partitioning is used. Bi-Tree partitioning divides a space into two equal parts, one dimension at a time, alternating between the two dimensions. Further P-picture partitions are mainly predicted using motion (with one or more references) rather than spatial prediction, although some subpartitions can use intra spatial prediction to deal with, for instance, uncovered background. For standard definition to higher resolution picture sizes, P-pictures start with 64×64 tiles before being divided. Finally, F-pictures also use Bi-Tree partitioning and start with 64×64 tiles for generating prediction partitions that mainly use motion (with one or more partitions), although some subpartitions can also use spatial prediction (for intra coding).

In NGV coding, there is much more to generation of inter prediction data than simply using motion vectors to generate prediction, and is discussed elsewhere. In P- and F-picture coding, each sub-partition's prediction is identified by including a prediction mode. The prediction modes include skip, auto, intra, inter, multi, and split. Skip mode is used to skip prediction coding when, for example, there is no, or relatively little change, from a reference frame to a current frame being reconstructed so that the pixel data need not be encoded and merely copied from one frame to the other when decoded. Auto mode is used when only partial data is needed so that for example, motion vectors may not be needed but transform coefficients are still used to code the data. Intra mode means that the frame or partition is spatially coded. Split means a frame or partition needs to be split into smaller parts or partitions before being coded. Inter mode means that multiple reference frames are determined for a current frame, and motion estimations are obtained by using each reference separately, and then the best result is used for the motion prediction data. Multi mode also uses multiple reference frames, but in this case, the motion estimation data from the multiple reference frames is combined, such as averaged, or weighted averaged, to obtain a single result to be used for the prediction.

One of the outputs of prediction partitions generator module 105 may be hundreds of potential partitionings (and more or less depending on the limits placed on the partitioning) of a tile. These partitionings are indexed as 1 . . . m and are provided to the encode controller 103 to select the best possible prediction partitioning for use. As mentioned, the determined potential prediction partitionings may be partitions for prediction (for example, inter- or intra-prediction) and may be described as prediction partitions or prediction blocks or the like.

In some examples, a selected prediction partitioning (for example, prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels, and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (for example, prediction partitions of a current frame) may be differenced with predicted partitions (for example, a prediction of the prediction partition of the current frame based on a reference frame or frames and other predictive data such as inter- or intra-prediction data) at differencer 106. The determination of the predicted partitions will be described further below and may include a decode loop 135 as shown in FIG. 1. As to the differences, the original partitioned blocks also are differenced with the prediction blocks to determine whether or not any residual signal exists that warrants encoding. Thus, not all subpartitions of a tile actually need to be coded (using transform coding for example) as prediction may have been sufficient for certain subpartitions.

Otherwise, any residuals or residual data (for example, partition prediction error data) from the differencing that indicate that the partition cannot be compensated by prediction alone (such as motion compensation alone) may be transmitted to coding partitions generator module (or by one example, coding bitree partitions generator) 107 to be further subpartitioned into smaller partitions for transform coding (coding partitions), and particularly for P-pictures and F-pictures by one example. In P- or F-pictures or frames, in some cases where very simple content and/or large quantizer step sizes exist, the coding partitions may equal the size of the entire tile, or the coding partitions and prediction partitions may have the same size in these cases. Thus, some P- and F-picture tiles may contain no coding partitioning, one coding partitioning, or multiple coding partitionings. These coding partitions are indexed as 1 . . . n and are provided to encode controller 103 to select the best possible combination of prediction and coding partitioning from the given choices.

Also, in some of these examples, such as for intra-prediction of prediction partitions in any picture type (I-, F- or P-pictures), or otherwise where prediction partitions are not further divided into coding partitions (where coding partitions are skipped), coding partitions generator module 107 may be bypassed via switches 107a and 107b. In such examples, only a single level of partitioning may be performed. Such partitioning, where only a single level of partitioning exists, it may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data. Coding partitions generator module 107 may generate potential coding partitionings (for example, coding partitions) of, for example, partition prediction error data using bi-tree and/or k-d tree partitioning techniques or the like.

After the partitioning (after prediction partitions are formed for I-pictures, and coding partitions are formed for P- and F-pictures, and in some examples, the potential coding partitions), the partitions may be transformed using adaptive or fixed transforms with various block sizes via adaptive transform module 108 (also, in one form, referred to as the Adaptive Multi-size Rect Hybrid Parametric Haar Transform (HPHT)/Discrete Cosine Transform (DCT) unit). By one approach, the adaptive transform module 108 may perform forward HPHT or forward DCT on rectangular blocks. By one example, partition/block size as well as selected transforms (for example, adaptive or fixed, and HPHT or DCT) may be determined based on a rate distortion optimization (RDO) or other basis. In some examples, both the selected coding partitioning and/or the selected transform(s) may be determined based on a predetermined selection method based on coding partitions size or the like. For example, adaptive transform module 108 may include a first portion or component for performing a parametric transform to allow locally optimal transform coding of small to medium size blocks, and a second portion or component for performing globally stable, low overhead transform coding using a fixed transform, such as DCT or a picture based transform from a variety of transforms, including parametric transforms, or any other configuration. In some examples, for locally optimal transform coding, HPHT may be performed. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

For HPHT transform, small to medium block sizes are supported while for DCT transform a large number of block sizes are supported. For HPHT transform, some overhead is needed to identify the direction, either horizontal or vertical in which DCT is applied while the PHT is applied in the orthogonal direction, as well as the mode (at least for intra-coding where a mode can be based on decoded pixels or prediction difference pixels). The actual PHT transform basis used for transforming a particular block may be content adaptive as it depends on decoded neighboring pixels. Since both encoder and decoder require calculation of the same basis matrix, the complexity of the calculation is kept low by allowing a limited number of good transforms known (to both encoder and decoder) that one can select from.

As shown, the resultant transform coefficients may be transmitted to adaptive quantize module 109, while a quantizer adapter control 133 at the encode controller 103 performs analysis of content to come up with locally adaptive quantization parameters that are then represented by a multi-level map that can be efficiently coded and included in the bitstream. The computed quantizer set (qs, and a matrix applied to a coefficient block) may be used by the adaptive quantizer module 109 to perform scaling of the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes the local decode loop 135 to form predicted partitions (or frames) for comparison to the prediction partitions as mentioned above. Preliminarily, depending on the RDO operation, not all of the hundreds or more tile partitions described above need to be fully coded such as when lookup of bitcounts are sufficient. Once the best partitioning of a tile is determined, however, in that case full coding may be provided.

The local decode loop 135 may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) for P and F-pictures may be transmitted to optional coding partitions assembler 114. Coding partitions assembler 114 may assemble coding partitions into decoded prediction partitions as needed (as shown, in some examples, coding partitions assembler 114 may be skipped such as for I-picture tile partitioning, and via switches 114a and 114b such that decoded prediction partitions may have been generated at adaptive inverse transform module 113) to generate prediction partitions of prediction error data or decoded residual prediction partitions or the like. As shown, the decoded residual prediction partitions (inter or intra) may be added to predicted partitions (for example, prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The next set of steps involve filtering, and intermingling of filtering and prediction generation. Overall four types of filtering are shown. Specifically, in FIG. 1, the reconstructed partitions are deblocked and dithered by a blockiness analyzer & deblock filtering module (also Recon Blockiness Analyzer & DD Filt Gen) 117. The resulting parameters for analysis ddi are used for filtering operation and are also coded and sent to the decoder via the bitstream 111. The deblocked reconstructed output is then handed over to the quality analyzer & quality restoration filtering module (or quality improvement filter also referred to herein as Recon Quality Analyzer & QR Filt Gen) 118, which computes QR filtering parameters and uses them for filtering. These parameters are also coded and sent via the bitstream 111 to the decoder. The QR filtered output is the final reconstructed frame that is also used as a prediction for coding future frames.

More specifically, when the reconstructed tiles or super-fragments may be transmitted to blockiness analyzer and deblock filtering module 117, the blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in bitstream 111 for use by a decoder, for example. The output of blockiness analyzer and deblock filtering module 117 may be transmitted to the quality analyzer and quality restoration filtering module 118. Quality analyzer and quality restoration filtering module 118 may determine QR filtering parameters (for example, for a QR decomposition) and use the determined parameters for filtering. The QR filtering parameters may also be coded in bitstream 111 for use by a decoder. In some examples, blockiness analyzer and deblock filtering module 117 and quality analyzer and quality restoration filtering module 118 may together be considered a filtering subsystem of encoder 100. In some examples, the output of quality analyzer and quality restoration filtering module 118 may be a final reconstructed frame that may be used for prediction for coding other frames (for example, the final reconstructed frame may be a reference frame or the like). Thus, as shown, the output of quality analyzer and quality restoration filtering module 118 may be transmitted to a multi-reference frame storage and frame selector (or multi reference control) 119 which also may be referred to as, or may include, the decoded picture storage or buffer. A dependency logic module 128 (also referred to, in one example, as dependency logic for mod multi ref pred in hierarchical picture group struct) may provide indices for listing the reference frames and the relationship among the frames such as frame dependencies, or more specifically partition dependencies, for proper ordering and use for the frames by the multi reference control 119 and when certain frames are to be selected for prediction of another frame. This may include providing the dependency logic for picture group structures such as multi-reference prediction, chain prediction, hierarchal structures, and/or other prediction techniques as described below.

Next, encoder 100 may perform inter- and/or intra-prediction operations. As shown in FIG. 1, inter-prediction may be performed by one or more modules including morphing generation and local buffer module 120 (and in one example is referred to as Morph Gen & Loc Buf, or referred to herein as the in-loop morphing generation module), synthesizing generation and local buffer module 121 (and in one example is referred to as Synth Gen & Pic Buffer or referred to herein as in-loop synthesizing generation module), motion estimator 122, characteristics and motion filtering and predictor module 123 (also in some examples may be referred to as Char and Motion AP Filter Analyzer & ¼ & ⅛ Pel Compensated Predictor), morphing analyzer and generation module (or out-of-loop morphing analyzer module) 130, and synthesizing analyzer and generation module (or out-of-loop synthesizing analyzer module) 132, where the morphing and synthesis generators 120 and 121 are considered in-loop (in the decoder loop of the encoder), and where the morphing and synthesis analyzers 130 and 132 are considered out-of-loop (out of the decoder loop at the encoder). Note that while one is called an analyzer and the other a generator, both in-loop and out-of-loop modules may perform the same or similar tasks (forming modified frames and modification parameters for morphing and/or synthesis). Using these components, morphing generation module 120, or morphing analyzer 130, may permit various forms of morphing and may analyze a current picture to determine morphing parameters for (1) changes in gain, (2) changes in dominant (or global) motion, (3) changes in registration, and/or (4) changes in blur with respect to a reference frame or frames with which it is to be coded, and prior to motion compensated prediction.

The out-of-loop morphing analyzer 130 and the synthesizing analyzer 132 receive picture group structure data from the adaptive picture organizer 104 and communicate with the encoder controller 103 to form the morphing and synthesis parameters (mop, syp) and modified reference frames based on the non-quantized, non-decoded, original frame data. The formation of the modified reference frames and modification parameters from the out-of-loop morphing and synthesis analyzers 130 and 132 may be much faster than that provided through the decoder loop 135, and this is especially advantageous for real time encoding. However, the use of the modified frames and parameters to perform compensation at another location, such as by a decoder, should be performed by the in-loop morphing and synthesis generators 120 and 121 on the decoding loop side of the encoder so that the correct compensation can be repeated when reconstructing frames at the decoder. Thus, the resulting modification parameters from the out-of-loop analyzers 130 and 132 are used by the in-loop morphing and synthesizing generator 120 and 121 to form the modified reference frames and for motion estimation by the motion estimator 122 to compute motion vectors. Thus, the computed morphing and synthesis parameters (mop and syp) may be quantized/de-quantized and used (for example, by morphing generation module 120) to generate morphed reference frames that may be used by motion estimator module 122 for computing motion vectors for efficient motion (and characteristics) compensated prediction of a current frame. The synthesizing generation module 121 uses several types of synthesized frames including super resolution (SR) pictures, projected interpolation (PI) pictures, among others in which motion compensated prediction can result in even higher gains by determining motion vectors for efficient motion compensated prediction in these frames. The details for some examples to perform morphing or synthesis are provided below Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed. Also, characteristics and motion filtering predictor module 123 may include adaptive precision (AP) filtering where filtering and prediction are intertwined. The filtering parameters (api) are coded and may be sent to the decoder via the bitstream 111.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes as introduced above and from among, "skip", "auto", "inter", "split", "multi", and "intra", for each prediction partition of a tile (or super-fragment), all of which may apply to P- and F-pictures (as well as B-pictures when they are present). It should be noted that while the system considers a configuration where I, P, and F picture are available, it is possible to still provide B-pictures where no morphing or synthesis is available for the B-pictures. In addition to prediction modes, it also allows for selection of reference types that can be different depending on "inter" or "multi" mode, as well as for P- and F-pictures. The prediction signal at the output of prediction modes and reference types analyzer module 125 may be filtered by prediction analyzer and prediction fusion filtering module 126. Prediction analyzer and prediction fusion filtering module 126 may determine parameters (for example, filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

In operation, some components of encoder 100 may operate as an encoder prediction subsystem. For example, such an encoder prediction subsystem of encoder 100 may include multi-reference frame storage and frame selector 119, in-loop morphing analyzer and generation module 120, in-loop synthesizing analyzer and generation module 121, motion estimator module 122, and/or characteristics and motion compensated precision adaptive filtering predictor module 123 as well as out-of-loop morphing analyzer 130 and synthesizing analyzer 132.

As will be discussed in greater detail below, in some implementations, such an encoder prediction subsystem of encoder 100 may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

For example, in such an encoder prediction subsystem of encoder 100, the output of quality analyzer and quality restoration filtering may be transmitted to multi-reference frame storage and frame selector 119. In some examples, the output of quality analyzer and quality restoration filtering may be a final reconstructed frame that may be used for prediction for coding other frames (e.g., the final reconstructed frame may be a reference frame or the like). In encoder 100, prediction operations may include inter- and/or intra-prediction. As shown, inter-prediction may be performed by one or more modules including morphing generation module 120, synthesizing generation module 121, and/or characteristics and motion compensated precision adaptive filtering predictor module 123.

As will be described in greater detail below, morphing generation module 120 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing generation module 120) to generate morphed reference frames. Such generated morphed reference frames may be stored in a buffer and may be used by motion estimator module 122 for computing motion vectors for efficient motion (and characteristics) compensated prediction of a current frame.

Similarly, synthesizing analyzer and generation module 121 may generate super resolution (SR) pictures and projected interpolation (PI) pictures or the like for determining motion vectors for efficient motion compensated prediction in these frames. Such generated synthesized reference frames may be stored in a buffer and may be used by motion estimator module 122 for computing motion vectors for efficient motion (and characteristics) compensated prediction of a current frame.

Accordingly, in such an encoder prediction subsystem of encoder 100, motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for gain compensation, or for any other characteristics compensated reference frame generation.

FIG. 1 illustrates example control signals associated with operation of video encoder 100, where the following abbreviations may represent the associated information:

scnchg Scene change information
spcpx Spatial complexity information
tpcpx Temporal complexity information
pdist Temporal prediction distance information
pap Pre Analysis parameters (placeholder for all other pre analysis parameters except scnchg, spcpx, tpcpx, pdist)
ptyp Picture types information
pgst Picture group structure information
pptn cand. Prediction partitioning candidates
cptn cand. Coding Partitioning Candidates
prp Preprocessing
xmtyp Transform type information
xmdir Transform direction information
xmmod Transform mode
ethp One eighth (⅛th) pel motion prediction
pptn Prediction Partitioning
cptn Coding Partitioning
mot&cod cost Motion and Coding Cost
qs quantizer information set (includes Quantizer parameter (Qp), Quantizer matrix (QM) choice)
mv Motion vectors
mop Morphing Parameters
syp Synthesizing Parameters
ddi Deblock and dither information
qri Quality Restoration filtering index/information
api Adaptive Precision filtering index/information
fii Fusion Filtering index/information
mod Mode information
reftyp Reference type information
idir Intra Prediction Direction The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, api, fii, quant coefficients and others may then be entropy encoded by adaptive entropy encoder 110 that may include different entropy coders collectively referred to as an entropy encoder subsystem. The adaptive entropy encoder 110 may be used to encode various types of control data/signals, parameters, modes and ref types, motion vectors, and transform coefficients. It is based on a generic class of low complexity entropy coders called adaptive variable length coders (vlc). The data to be entropy coded may be divided into several categories when convenient (seven in our case), and starting from generic vlc coders, specialized coders are developed for each category. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
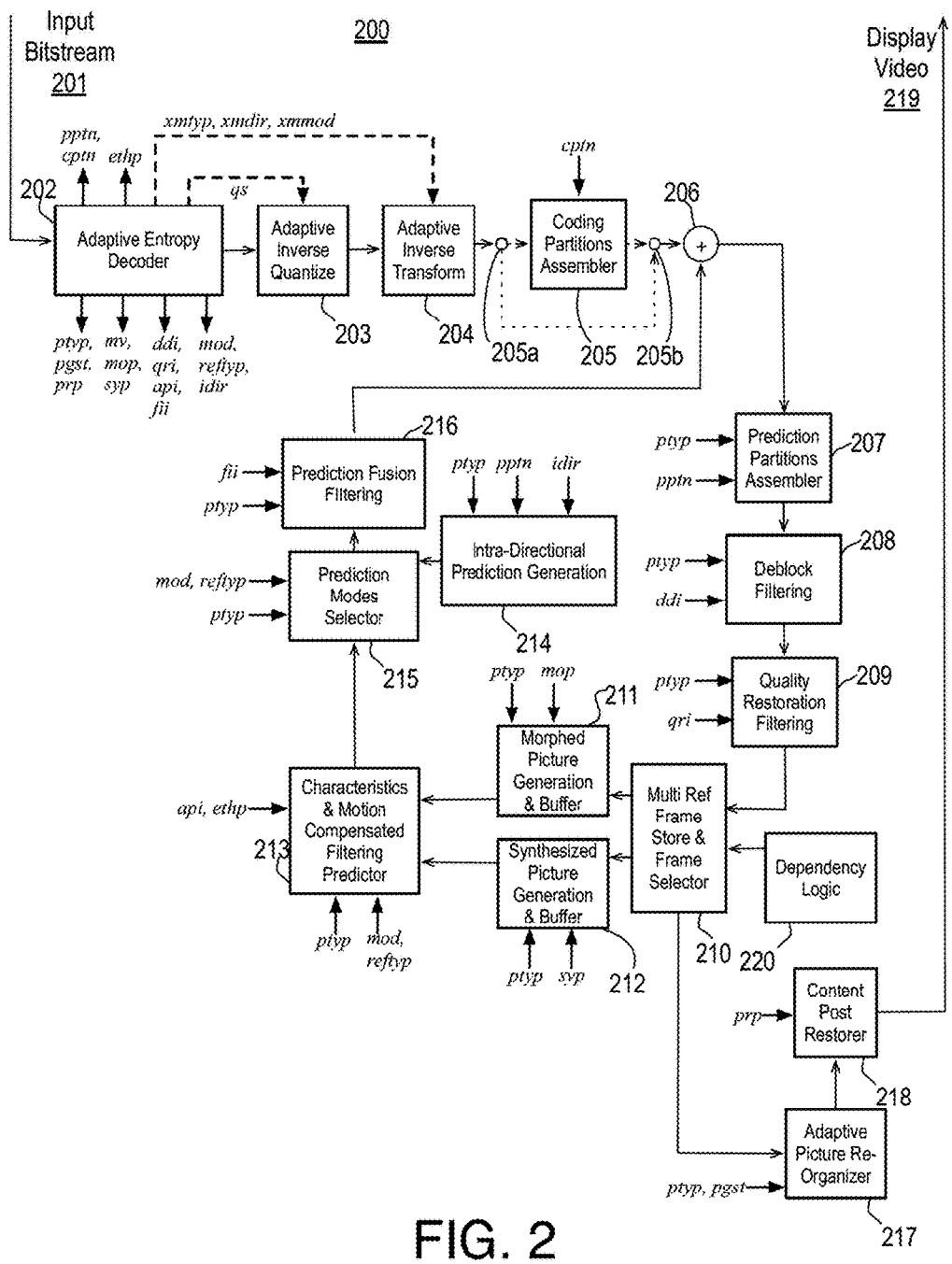
FIG. 2 is an illustrative diagram of an example next generation video decoder.

FIG. 2 is an illustrative diagram of an example next generation video decoder 200, arranged in accordance with at least some implementations of the present disclosure and that utilizes the content adaptive P- and F-pictures and resulting picture groups herein. The general operation of this NGV decoder 200 may be similar to the local decoding loop in the NGV Encoder 100 discussed earlier with the caveat that the motion compensation decoding loop in a decoder does not require any components that require analysis to determine parameters as the parameters are actually sent via the bitstream 111 or 201 to decoder 200. The bitstream 201 to be decoded is input to adaptive entropy encoder (Content and Context Adaptive Entropy Decoder) 202 which decodes headers, control signals and encoded data. For instance, it decodes ptyp, pgst, prp, pptn, cptn, ethp, mop, syp, mod, reftyp, idir, qs, xmtyp, xmdir, xmmod, ddi, qri, api, fii, mv, listed above, and quantized transform coefficients that constitute the overhead, control signals and data that is distributed for use throughout the decoder. The quantized transform coefficients are then inverse quantized and inverse transformed by adaptive inverse quantize module 203 and adaptive inverse transform (also Adaptive Multi-size Rect HPHT/DCT) 204 to produce rectangular partitions of decoded pixel differences that are assembled as per coding partitioning used. Predictions are added to the differences resulting in generation of recon (reconstructed) coded partitions that undergo further reassembly as per motion partitioning to generate reconstructed tiles and frames that undergo deblocking and dithering in deblocking filter (Recon DD Filt Gen) 208 using decoded ddi parameters, followed by quality restoration filtering (or Recon QR Filt Gen) 209 using decoded qri parameters, a process that creates the final recon frames.

The final recon frames are saved in multi-reference frame storage and frame selector (also may be called decoded picture buffer) 210, and are used (or morphed) to create morphed pictures/local buffers (at morphed picture generator and buffer 211) depending on the applied, decoded mop parameters. Likewise synthesized picture and local buffers (at synthesized picture generation and buffer 212) are created by applying decoded syp parameters to multi-reference frame storage and frame selector 210 (or in other words, the reconstructed frames in the storage or buffer 210). A dependency logic 220 may hold the index for, and perform the indexing for, the stored frames in the multi-reference frame storage 210. The indexing may be used for prediction techniques such as multi-reference frames, chain prediction and/or hierarchal (or pyramid) frame structures, and/or others as described below. The morphed local buffers, and synthesized frames are used for motion compensated prediction that uses adaptive precision (AP) filtering based on api parameters, and keeps either ¼ or ⅛ pel prediction depending on a decoded the ethp signal. In fact, a characteristics and motion compensated filtering predictor 213, depending on the mod, generates "inter" multi "skip" or "auto" partitions while an intra-directional prediction generation module 214 generates "intra" partitions, and prediction modes selector 215, based on an encoder selected option, allows partition of the correct mode to pass through. Next, selective use of prediction fusion filter generation module (or Pred FI Filter Gen) 216 to filter and output the prediction is performed as needed as the second input to the adder.

The recon frames at the output of the quality filter generation module 209 (or Recon QR Filt Gen) are reordered (as F-pictures are out of order) by adaptive picture reorganizer (or Hierarchical Picture Group Structure Reorganizer) 217 in response to control parameters of ptyp and pgst, and further the output of this reorganizer undergoes optional processing in content post restorer 218 that is controlled by prp parameters sent by the encoder. This processing among other things may include deblocking and film grain addition.

More specifically, and as shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to multi-reference frame storage and frame selector (which may be referred to as a multi-reference control, and may be, or may include, a decoded picture buffer) 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F-pictures, based on mode selection data in input bitstream 201. In addition to prediction modes, it also allows for selection of reference types that can be different depending on "inter" or "multi" mode, as well as for P- and F-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

In operation, some components of decoder 200 may operate as a decoder prediction subsystem. For example, such a decoder prediction subsystem of decoder 200 may include multi-reference frame storage and frame selector 210, dependency logic 220 to index the frames at the multi-reference frame storage and frame selector 210, morphing analyzer and generation module 211, synthesizing analyzer and generation module 212, and/or characteristics and motion compensated precision adaptive filtering predictor module 213.

As will be discussed in greater detail below, in some implementations, such a decoder prediction subsystem of decoder 200 may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

For example, in such a decoder prediction subsystem of decoder 200, the output of quality restoration filtering module may be transmitted to multi-reference frame storage and frame selector 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

As will be described in greater detail below, morphing analyzer and generation module 211 may use de-quantized morphing parameters (e.g., determined from input bitstream) to generate morphed reference frames. Such generated morphed reference frames may be stored in a buffer and may be used by characteristics and motion compensated precision adaptive filtering predictor module 213.

Similarly, synthesizing analyzer and generation module 212 may be configured to generate one or more types of synthesized prediction reference pictures such as super resolution (SR) pictures and projected interpolation (PI) pictures or the like based on parameters determined from input bitstream 201. Such generated synthesized reference frames may be stored in a buffer and may be used by motion compensated filtering predictor module 213.

Accordingly, in such a decoder prediction subsystem of decoder 200, in cases where inter-prediction is applied, characteristics and motion compensated filtering predictor module 213 may apply motion compensation based on morphed reference frame(s) and/or super resolution (SR) pictures and projected interpolation (PI) pictures along with the current frame.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 and 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/ or systems such as transceivers, antennae, network systems, and the like not depicted in FIGS. 1 and 2. Therefore, in various implementations, encoder 100 and decoder subsystem 200 may be implemented either together or independent of one another.

FIG. 3 is an illustrative diagram of example subsystems associated with next generation video encoder 100, arranged in accordance with at least some implementations of the present disclosure. As shown, encoder 100 may include a structure subsystem 310, a partitioning subsystem 320, a prediction subsystem 330, a transform subsystem 340, a filtering subsystem 350, and/or an entropy coding subsystem 360.

Figure 3A:
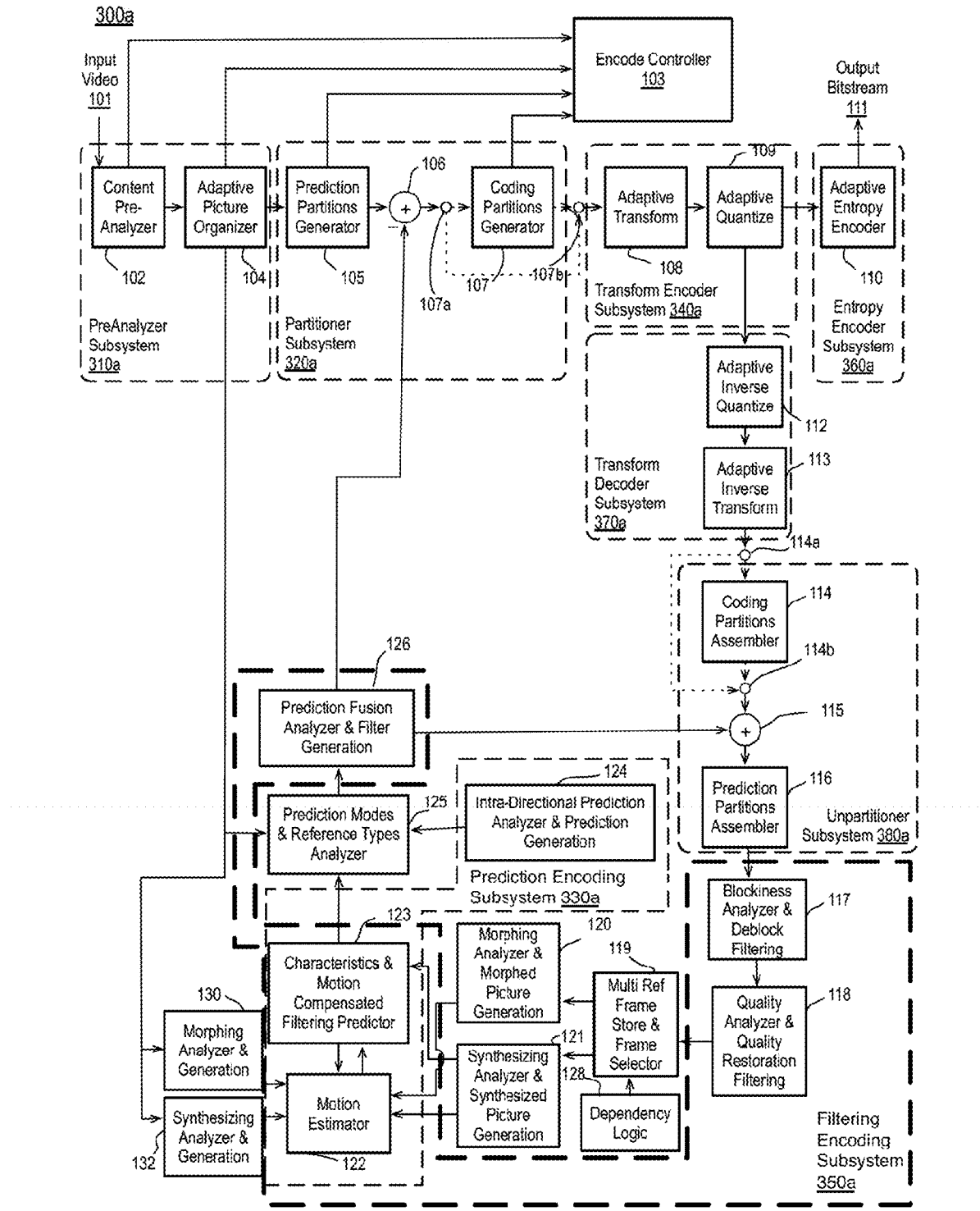
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include pre-analyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartitioner subsystem 380a. Pre-analyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartitioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyperthreading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content pre-analyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, pre-analyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
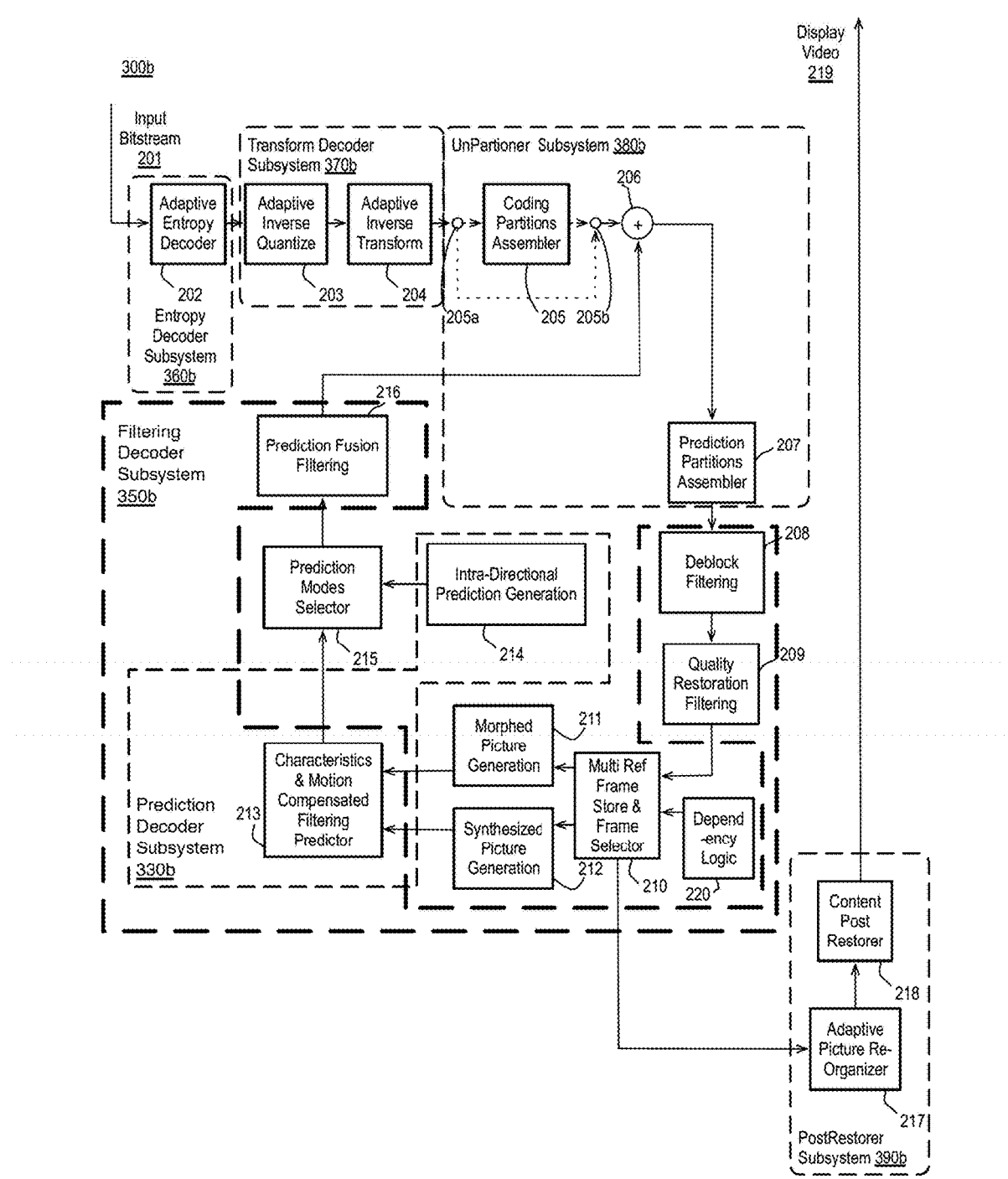
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or post-restorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Post-restorer subsystem 790 may include content post restorer module 218 and/or adaptive picture re-organizer 217.

Entropy decoding subsystem 360*b* of decoder 300*b* may perform the inverse operation of the entropy encoder subsystem 360*a* of encoder 300*a*, i.e., it may decode various data (types of overhead, motion vectors, transform coefficients) encoded by entropy encoder subsystem 360*a* using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370*b* of decoder 300*b* may perform inverse operation to that of transform encoder subsystem 340*a* of encoder 300*a*. Transform decoder subsystem 370*b* may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380*b* of decoder 300*b* may perform inverse operation to that of partitioner subsystem 320*a* of encoder 300*a* and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300*a* for region segmentation or slices, adaptive picture re-organizer module 217 may be needed at the decoder.

Prediction decoder subsystem 330*b* of decoder 300*b* may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350*b* of decoder 300*b* may perform multiple filtering of the reconstructed pictures based on parameters sent by encoder 300*a* and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Post-restorer subsystem 390*b* of decoder 300*b* is an optional block that may perform further improvement of perceptual quality of decoded video. This processing can be done either in response to quality improvement parameters sent by encoder 100, or it can be standalone decision made at the post-restorer subsystem 390*b*. In terms of specific parameters computed at encoder 100 that can be used to improve quality at post-restorer subsystem 390*b* may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, post-restorer subsystem 390*b* may decode these parameters and may use them to optionally perform additional deblocking prior to display. In addition, encoder 100 also may have access to scene change, spatial complexity, temporal complexity, motion range, and prediction distance information that may help in quality restoration in post-restorer subsystem 390*b*.

While subsystems 330*b* through 390*b* are illustrated as being associated with specific example functional modules of decoder 300*b* in FIG. 3(*b*), other implementations of decoder 300*b* herein may include a different distribution of the functional modules of decoder 300*b* among subsystems 330*b* through 390*b*. The present disclosure is not limited in this regard and, in various examples, implementation of the example subsystems 330*b* through 390*b* herein may include the undertaking of only a subset of the specific example functional modules of decoder 300*b* shown, additional functional modules, and/or in a different arrangement than illustrated.

Referring to FIGS. 4 to 20, specific picture groups, reference frames, and their dependencies to a frame to be predicted are discussed. NGV video coding differs from standards based approaches as it naturally incorporates significant content based adaptivity in video coding process to achieve higher compression. By comparison, standards based video coding approaches typically tend to squeeze higher gains by adaptations and fine tuning of legacy approaches. For instance, all standards based approaches heavily rely on adapting and further tweaking of motion compensated interframe coding as the primary means to reduce prediction differences to achieve gains. On the other hand, NGV, in addition to exploiting interframe differences due to motion compensation, also exploits other types of interframe differences such as that by compensating for various types of morphing (gain, blur/registration, dominant/global motion) that naturally exist in typical video scenes, as well as extracts and employs hidden spatial and temporal resolution captured in synthesized (super resolution (SR), projected interpolation (PI)) frames.

Referring to FIG. 4, often in imaging of video scenes, there can be sudden changes in brightness not caused by motion, thus motion compensation by itself may not be sufficient for removing temporal redundancies. For instance, the changes in brightness may be caused by actual physical events such as camera flashes, blinking, flickering, or strobe lights, light bulbs suddenly turned off/on, lightning from a storm, edit effects such as fades or blends, and so on. In such cases, compensation of gain between frame pairs where such changes exist would be advantageous for compression. One type of morphed prediction used by NGV coding is gain compensated prediction, and includes detecting and estimating the gain and/or offset luminance values, parameterizing them, using them for compensation of gain/offset at the encoder, transmitting them to the decoder, and using them at the decoder for gain compensation by replicating the gain compensation process at the encoder.

By one detailed example, often in video scenes, frame to frame differences are caused not only due to movement of objects but also due to changes in gain/brightness. Sometimes such changes in brightness can be global due to editing effects such as a fade-in, a fade-out, or due to a crossfade. However, in many more cases, such changes in brightness are local for instance due to flickering lights, camera flashes, explosions, colored strobe lights in a dramatic or musical performance, etc.

The compensation of interframe changes in brightness, whether global or local, can potentially improve compression efficiency in video coding. However, the brightness change parameters (gain and offset) are applied both at a video encoder and a decoder so that both should be efficiently communicating with low bit-cost from encoder to decoder via the bitstream and the processing complexity for the decoder should be minimized. In the past, only techniques for global brightness change have been disclosed, but local compensation in brightness changes have not been successfully addressed.

The following equation relates brightness of a pixel $s_t(i,j)$ at (i,j) location in frame 't' to brightness of a pixel at the same location (i,j) in a previous frame 't−1', with 'a' and 'b' being the gain and offset factors. Motion is assumed to be small and only the brightness changes are modeled.

$$s_t(i,j) = a \times s_{t-1}(i,j) + b \tag{1}$$

Taking the expected value of $s_t(i,j)$ and $(s_t^2(i,j))$, and following a method of equating first and second moments of current frame and the previous frame, the value of gain 'a' and offset 'b' can then be calculated as:

$$a = \frac{\sqrt{(E(s_t^2(i,j)) - (E(s_t(i,j)))^2}}{\sqrt{(E(s_{t-1}^2(i,j)) - (E(s_{t-1}(i,j)))^2}} \tag{2}$$

$$b = E(s_t(i,j)) - a \times E(s_{t-1}(i,j)) \tag{3}$$

Once 'a' and 'b' are calculated as per equation (2), they are quantized (for efficient transmission), encoded and sent to the decoder. At the decoder, decoded dequantized values of 'a', and 'b' are put back into equation (1), and using decoded values of pixels in the previous frame, a gain compensated modified version of a previous reference frame is calculated that is lower in error than the original previous frame, and is then used for generating (gain compensated) motion compensated prediction. To the (inverse transformed, and dequantized) decoded prediction error blocks, the corresponding predictions from modified previous reference frames are added to generate the final decoded frame (or blocks of the frame).

For local motion compensation, instead of a single set of (a, b) parameters, multiple sets of parameters are computed and transmitted along with the map of which portion of the frame corresponds to which parameters, and to the decoder and used for gain compensation as described.

FIG. 4 shows a picture structure 400 using P-pictures 402, 406, 412, and F-pictures 404, 408, 410 (defined below). Each P-picture is predicted, or has at least a part, partition, or so forth, predicted from at least one previous P-picture, or an I-picture, as shown by arrows A. For now assume that F-pictures are similar to B-pictures in that the F-picture may be predicted from a previous reference frame, a subsequent reference frame, or both as shown by the arrows B. The picture structure 400 includes an adaptive number of F-pictures, multi reference prediction, and gain/offset compensation that can be applied on a picture or partition basis. For instance, as mentioned, frames at time 'n' (402), 'n+2' (406), and 'n+5' (412) are coded as P-pictures while frames at time 'n+1' (404), 'n+3' (408), and 'n+4' (410) are coded as F-pictures. The P-picture at 'n+5' (412) is shown to use multi-reference prediction as it employs prediction both from 'n+2' (406) as it may in normal prediction, but also adds frame 'n' (402 as shown by arrow C) as a previous prediction reference frame. Multi-reference prediction occurs whenever a P-picture, or an F-picture, has multiple previous reference frames.

A main difference of such a scheme with that of H.264/MPEG-4 part 10 based coding is the use of gain/offset compensation on frames 'n' and 'n+2'. For instance, gain/offset values can be estimated and parameterized at frame 'n' as compared to frame 'n+2', for use in generating a modified (gain/offset compensated) prediction frame, and instead of performing motion estimation/compensation on actual frame 'n', it is performed on a modified gain/offset compensated frame GC (414) to predict frame n+1 (404) by one example, and may also be used to predict P-picture 412 instead of using P-picture 402 to predict P-picture 412. Similarly, gain compensated frame GC (416) may be a modification of frame n+2 (406), and used to predict frame n+12 (412). For clarification, by one example, the estimation of (gain/offset, referred to as GC) parameters can be performed on either the original (uncoded) frames, such as by morphing analyzer 130, or on decoded frames by the morphing generator 120. However, the compensation needs to be performed on 'decoded frames' so that the decoder can replicate the compensation process. Thus, the difference between an original frame at a time instant and its approximation may be provided by a gain compensated, motion compensated, frame GC (414). The difference then may be computed and transform coded, and coded with less bits (including gain parameters cost) than what it would take without use of gain compensation. This also suggests a main difference between B-pictures and F-pictures in that, F-pictures support use of modified reference frames, in this case modification of the reference frame was performed by using gain compensation parameters.

Alternatively or additionally, in imaging of video scenes, there can be changes in blur/registration such that motion compensation by itself may not be sufficient for removing temporal redundancies. For instance, the changes in blur/registration may be caused by actual physical events such as fast movement of objects in a scene or fast movement of a camera, or both, mechanical mismatch in sprockets of film while scanning, vibration of stationary camera, and so forth, that appears as blur/registration mismatch. In such cases, compensation of blur/registration between frame pairs where such changes exist would be advantageous for compression. The principle of blur/registration compensated prediction may include a type of morphed prediction used by NGV coding, and including detecting and estimating the blur/registration values, parameterizing the blur/registration values, using the blur/registration values for compensation of blur at the encoder, transmitting the blur/registration values to the decoder, using the blur/registration values at the decoder for blur/registration compensation by replicating the blur/registration compensation process at the encoder.

By one detailed example, methods for compensation of Registration and Blur are described below although the terms can be used interchangeably.

Registration Compensation:

A stationary video camera imaging a scene might still result in shaky or unstable video that differs frame to frame due to environmental factors (such as wind), vibrations from nearby objects, a shaky hand, or a jittery capture process, rather than global movement of the scene or motion of large objects in the scene. This results in frame to frame registration differences, the compensation of which (in addition to other forms of compensation such as gain, global/dominant motion, and local motion compensation) may result in improvement of compression efficiency of video coding.

For computing registration parameters between a current frame and a previous reference frame, Wiener filtering can be employed. Let x(n) be the input signal, y(n) be the output, and h(n) represent filter coefficients.

$$\text{Filter output: } y(n) = \sum_{k=0}^{N-1} h(k)x(n-k) \tag{4}$$

$$\text{Error signal: } e(n) = d(n) - y(n) \tag{5}$$

In matrix notation, h is the vector of filter coefficients. The cross-correlation row vector (between source frame and reference frame):

$$R_{dx} = E[d(n) \times (n)^T] \tag{6}$$

The autocorrelation matrix (based on block data):

$$R_{xx} = E[x(n) \times (n)^T] \tag{7}$$

The Wiener Hopf equation to solve for h as then as follows. The Wiener Hopf equation determines optimum filter coefficients in mean square error, and the resulting filter is called the 'wiener' filter.

$$h = R_{xx}^{-1} R_{dx} \tag{8}$$

Blur Compensation:

A fast camera pan of a scene may, due to charge integration, result in blurry image. Further, even if a camera is still, or in motion, if a scene involves fast moving objects, for instance football players in a football game, the objects can appear blurry as the temporal resolution of the imaging is not sufficient. In both of the aforementioned cases, compensation of blur prior to or in conjunction with other forms of compensation, may improve compression efficiency of video coding.

For motion blur estimation, a Lucy-Richardson method can be used. It is an iterative algorithm for successively computing reduced blur frame (X) at iteration i, from Y the source frame, using B, the blur operator (blur frame using estimated blur vectors) and B* an adjoint operator. The operator B* can be roughly thought of as the same as B as B* can be replaced by B resulting in roughly the same visual quality.

$$X_{i+1} = X_i \cdot B^* \left( \frac{Y}{B(X_i)} \right), X_0 = Y \tag{9}$$

Thus, another main difference of such a scheme with that of H.264/MPEG-4 part 10 based coding may be the use of blur/registration compensation on frames 'n' and 'n+2' as shown by modified BC (or RC) frames 418 and 420 for respectively predicting frames 404 and 412. For instance, blur/registration values can be estimated and parameterized at frame 'n' as compared to frame 'n+2', for use in generating a modified (blur compensated) prediction frame and instead of performing motion estimation/compensation on actual frame 'n', it is performed on blur/registration compensated frame. For clarification as mentioned above, the estimation of (blur, referred to as BC) parameters can be done on either the original (uncoded) frames or on decoded frames, however the compensation needs to be performed on 'decoded frames' so that the decoder can replicate the compensation process. Thus, the difference between an original frame at a time instant and its approximation, blur/registration compensated motion compensated frame is computed and transform coded with less bits (including blur parameters cost) than what it would take without use of blur/registration compensation. This also suggests that a main difference between B-pictures and F-pictures in that, F-pictures support use of modified references, in this case modification of a reference frame was performed by using blur/registration compensation parameters. It will be understood that modified frames BC 418 and 420 may be used instead of, or in addition to, gain compensation modified frame GC 414 and 416.

In yet a further way to alternatively or additionally morph frames, in imaging of video scenes, there can be changes in global/dominant motion that may block motion compensation by itself, and may not be sufficient for removing global temporal redundancies. For instance, the changes in global/dominant motion may be caused by actual physical events such as panning, zooming in/out, or rotation or tilt of a camera, and/or large object motion that appears as global/dominant motion. In such cases, compensation of global/dominant motion between frame pairs where such changes exist would be advantageous for compression. The principle of global/dominant motion compensated prediction includes using a type of morphed prediction used by NGV coding and may include detecting and estimating the global/dominant motion of a frame, parameterizing, and using the motion data for compensation of global/dominant motion at the encoder, transmitting it to the decoder, and using it at the decoder for compensation by replicating the global/dominant motion compensation process at the encoder.

By one detailed example, since global motion in video can present a challenge to block based on prediction (due to larger prediction resulting from a translatory motion model, and a significant amount of motion vector overhead), an alternative approach was developed that directly estimates/compensates global motion due to its potential of being able to better adapt to nontranslatory/complex motion, and a more compact representation of motion parameters is now available as needed such as once per picture. Among the choice of motion models for Global Motion, the two models that offer significant benefits are the Affine Model, and the Perspective Model. The affine model uses six parameters, and is able to address a large range of complex motions, while the perspective model is more complex and flexible, but can use up to eight parameters. The affine model may be sufficient for many cases and can allows global compensation for motion of types such as translation, zoom, shear, and rotation.

Mathematically the affine transform process is described by the following equations that use affine parameters a, b, c, d, e, f to map a set of points (x,y) in previous frame to a modified set of points (x', y').

$$x_i' = a \cdot x_i + b \cdot y_i + c \quad (10)$$

$$y_i' = d \cdot x_i + e \cdot y_i + f \quad (11)$$

For efficient transmission of global motion parameters to the decoder, the model is transmitted as 3 motion trajectories, one for top-left corner of the picture, one for top-right corner of the picture, and one for bottom-left corner of the picture. Affine parameters are calculated (fixed point arithmetic) for a virtual picture which is assumed to be of width and height of nearest power of 2 number which greater than the coded picture. This removes divisions required at the decoder.

Assume for three vertices (x0, y0), (x1, y1), (x2, y2) corresponding motion trajectories mt0, mt1, and mt2 are given and can be represented as (dx0, dy0), (dx1, dy1), and (dx2, dy2) say in ⅛ pel units. The affine parameters A, B, C, D, E, and F can then be calculated as follows.

$$C = dx0 \quad (12)$$

$$F = dy0 \quad (13)$$

$$A = W^*((x1+dx1)-(x0+dx0))/W \quad (14)$$

$$B = W^*((x2+dx2)-(x0+dx0))/W \quad (15)$$

$$D = H^*(((y1+dy1)-(y0+dy0))/H) \quad (16)$$

$$E = H^*(((y2+dy2)-(y0+dy0))/H) \quad (17)$$

While use of affine model based Global Motion Estimation/Compensation (GME/C) was a notable improvement for scenes with global motion over use of block based translatory motion, in reality both block based local and global motion is combined for best coding efficiency results. Further, the affine model can also be applied for motion compensation of non-overlapping tiles, or regions/objects in a scene. This results in multiple global motion parameter sets, and the process is referred to as performing dominant motion compensation (DC).

Here, the main difference of such a scheme with that of H.264/MPEG-4 part 10 based coding is the use of global/dominant motion compensation on frames 'n' (402) and 'n+2' (406). For instance, global/dominant motion values can be estimated and parameterized at frame 'n' (402) as compared to frame 'n+2' (406), for use in generating modified (global/dominant motion compensated) prediction frame 422 or 424 to predict frames 404 and 412 respectively, and instead of performing motion estimation/compensation on actual frame 'n' (402), it is performed on global/dominant motion compensated frame 422, for example. For clarification, the estimation of (global/dominant motion, referred to as DC) parameters can be performed on either the original (uncoded) frames or on decoded frames, as mentioned above however, the compensation needs to be performed on 'decoded frames' so that the decoder can replicate the compensation process. Thus, the difference between original frame at a time instant and its approximation, global/dominant motion compensated block motion compensated frame is computed and transform coded with less bits (including blur parameters cost) than what it would take without use of global/dominant motion compensation. This also suggests the another main difference between B-pictures and F-pictures in that, F-pictures support use of modified references, in this case modification of reference was performed by using global/dominant motion compensation parameters.

The morphing strategies may be performed alone or in any combination, such as GC, BC, or DC each by itself, all three combined together to form three modified frames, or a combination of any two of them together to form two modified frames.

With the sequence 400, then, it will be understood that modified frames replace, or may be used in addition to, a corresponding frame in the main sequence, and both F-pictures and P-pictures may use the modified frames as their reference frames. Thus, by one alternative example, morphed frames 414, 418, and 422 could be used as past reference frames for P-picture 406 instead of, or in addition to, as references for F-picture 404. Also, morphed frames 416, 420, and 424, could be used as future reference frames for F-picture 404 and/or past reference frames for F-pictures 408 and 410. Thus, it will be understood that many different alternatives exist as found beneficial for the coding, and is not limited to those shown in the figures.

Sequence 400 also demonstrates that F-pictures can be used with an adaptive mode or prediction technique where the number of F-pictures between two anchor frames (such as two P-pictures or an I-picture and P-picture, or other F-picture) may vary. Thus, only one F-picture exists between P-pictures 402 and 406, while two F-pictures exist between P-pictures 406 and 412. The number of F-pictures between anchor frames may be limited to zero to four by one example, and may depend on the speed of the motion of the objects in the frame sequence. Specifically, F-pictures may be the most efficient frames for coding since they may often require the least amount of bits compared to any other type of picture. However, the faster the motion of objects in the frames, the more detail is needed to properly show those objects in motion at least at the anchor frames. Thus, with very slow motion, many F-pictures may be used between anchor frames, while fast motion may reduce the permitted number of F-frames between anchor frames to very few or none to produce acceptable, good quality images of the objects in motion.

Figure 5:
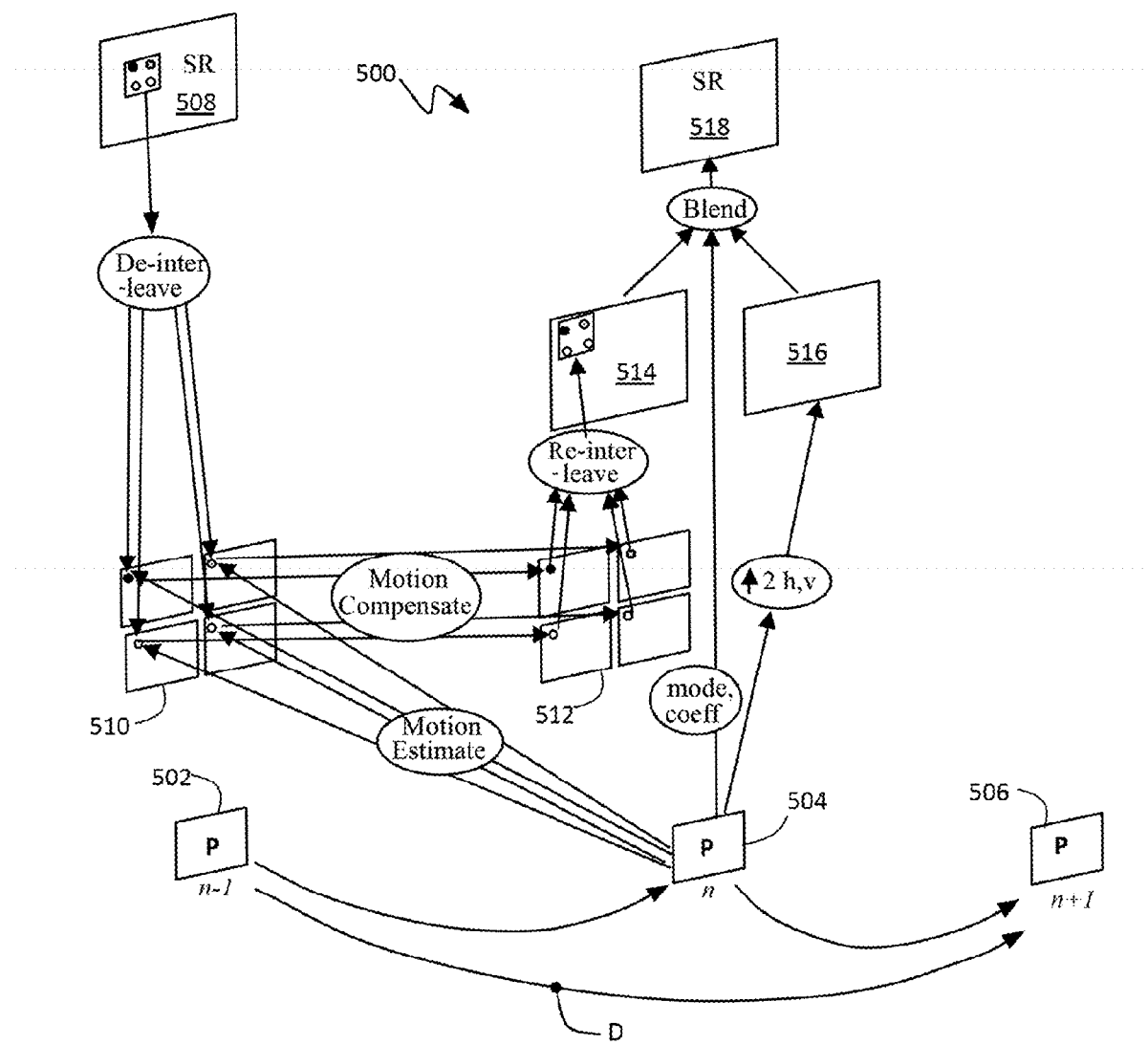
FIG. 5 is an illustrative diagram of a super resolution process of a modified reference frame.

Referring to FIG. 5, besides morphed prediction (gain, blur/registration, global/dominant motion) pictures, synthesized prediction (super resolution (SR), and projected interpolation (PI)) pictures are also supported. In general, super resolution (SR) is a technique used to create a high resolution reconstruction image of a single video frame using many past frames of the video to help fill in the missing information. The goal of a good super resolution technique is to be able to produce a reconstructed image better than up-sampling alone when tested with known higher resolution video. The super resolution generation technique herein may use coded video codec data to create an in-loop super resolution frame. The in-loop super resolution frame is used again within the coding loop as the name implies. The use of SR in a coding loop provides significant gain in the low resolution video coding and thus in the reconstructed super resolution video. This process uses an algorithm that combines and uses codec information (like modes intra, motion, coefficients. etc.) along with current decoded frames and past frames (or future frames if available) to create a high resolution reconstruction of the current frame being decoded. Thus the proposed technique is fast and produces good visual quality.

For sequences where the movement is slow and content is fairly detailed (many edges, texture, and so forth), the ability to generate super resolution frames for use in prediction can provide greater motion compensation accuracy, and thereby permit a higher degree of compression. As shown in FIG. 5, a process 500 is diagrammed where the principle of generation of SR prediction is applied to P-pictures, which is a type of synthesized prediction used by NGV coding. In this case, both the encoder and decoder generate the synthesized frame from previously available decoded frames and data. A SR frame 518 double the size of frame 'n' 504 in both the horizontal and vertical dimensions is generated by blending upsampled decoded P frame 516 at 'n', and motion compensated picture 514 constructed by using a previous SR frame 508 at 'n−1'. The previous SR frame 508 is de-interleaved and combined with the motion estimation values at de-interleaved blocks 510 by using the current P-picture 504. The blocks 510 are used for motion compensation to form motion compensated, de-interleaved blocks 512, which are then re-interleaved onto a block to form the motion compensated picture 514. Multi reference prediction is also shown for the P-picture at frame n+1 by arrow D.

Another type of synthesized prediction, referred to as projected interpolation (PI) prediction frame generation is discussed below in relation to FIG. 12, and is one of the various modified reference predictions supported by content based P-, and F-pictures in NGV coding. Projected interpolation forms a modified reference frame purely or substantially from data from one or more other reference frames, and is not itself an image or picture for display. By one example, it is used only as a reference frame.

Referring to FIG. 6, one example process 600 for a computer-implemented method for video coding is arranged in accordance with at least some implementations of the present disclosure. Process 600 may include one or more operations, functions or actions as illustrated by one or more of operations 602, 604, and/or 606. Process 600 may form at least part of a next generation video coding process. By way of non-limiting example, process 600 may form at least part of a next generation video encoding process as undertaken by encoder system 100 of FIG. 1, decoder system of FIG. 2, and/or any of the other coder systems of FIGS. 1-3, 7-8, 10-11, 15-16, and/or 22-24.

Process 600 may comprise "receiving data for a group of pictures comprising a sequence of frames of pixel data, the sequence having a display order, and wherein each frame is associated with a temporal position of the display order" 602. The process 600 also may comprise "generating at least one current F-picture using inter-prediction, comprising providing the option to form at least one part of the current F-picture from a previous prediction reference frame, a subsequent prediction reference frame, or both, wherein previous and subsequent are relative to the position of the current F-picture and within the sequence" 604. The process 600 also may comprise "generating motion data for the part of the at least one current F-picture comprising using at least one modified prediction reference frame for generating the motion data for the part of the current F-picture, and the at least one modified prediction reference frame being modified by using a morphing technique or a synthesizing technique or both" 606. As explained herein, the modified reference, refers to morphing and/or synthesis of a reference frame, where morphing may include gain or offset compensation (GC), blurring or registration compensation (BC or RC), and/or dominant or global motion compensation (DC) as well as others that may be included. Synthesis includes super resolution (SR) and/or projected interpolation (PI) as well as other similar techniques, and as described herein.

Figure 7:
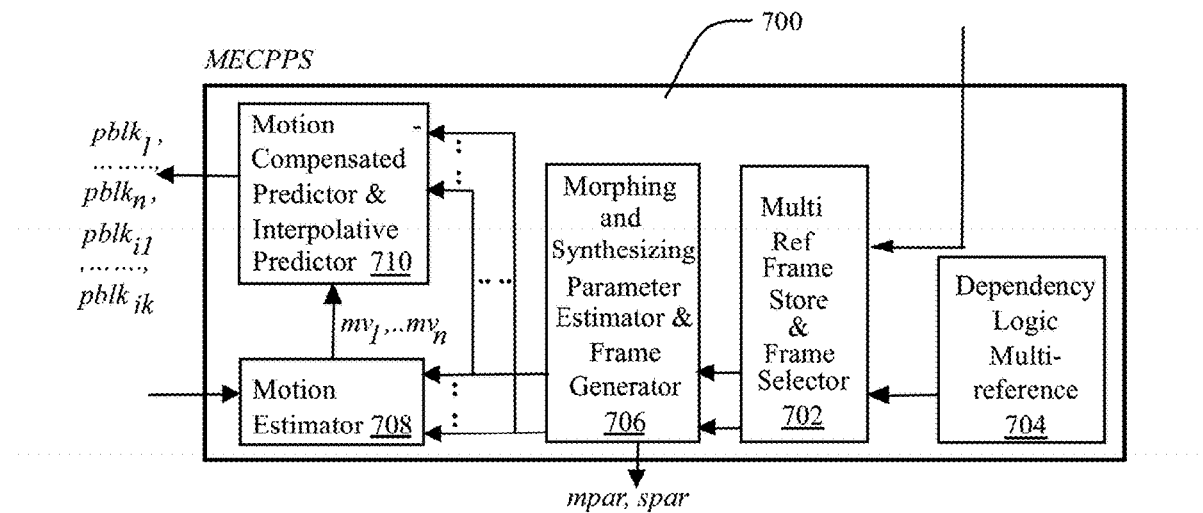
FIG. 7 is an illustrative diagram of an example encoder subsystem.

Referring to FIG. 7, while a more complete example NGV encoder is shown in FIG. 1, a relevant encoder subsystem 700 may be referred to as motion estimator, compensated predictor and picture store (MECPPS) that is used for generating the predictions for content adaptive P-pictures, and F-Pictures herein. In the interest of keeping the focus on core concepts, some simplifications have been made such as operations for calculation of direct mode (used for 'prediction', and as a default for 'skip' mode) are not shown. The MECPPS subsystem 700 may have several components, such as frame stores (Multi Reference Frame Stores & Frame/s Selector 702) that store decoded frames, and its associated logic (Dependency Logic for Mod Multi Ref Frames Pred 704) that allows indexing of a frame from frame stores based on the modified multi ref prediction to be generated. The encoder subsystem 700 also has a unit 706 that actually computes morphed or synthesized prediction frames or blocks (referred to as the Morphing and Synthesizing Par (parameter) Estimator & Frame Generator). A motion estimator 708 and motion compensated (MC) predictor & MC Interpolative Predictor 710 also may be part of subsystem 700. The parameters mpar, and spar used for computing morphed or synthesized frames, are sent to the decoder. The end result at the encoder is generation of a number of modified prediction candidates to choose from and to choose to apply for a block. Some of these candidates are actual modified prediction blocks (pblk1, . . . pblkn), and the others are interpolated modified prediction blocks (pblki1, . . . pblkik) by combining actual modified blocks, or blocks generated from direct prediction modes.

Figure 8:
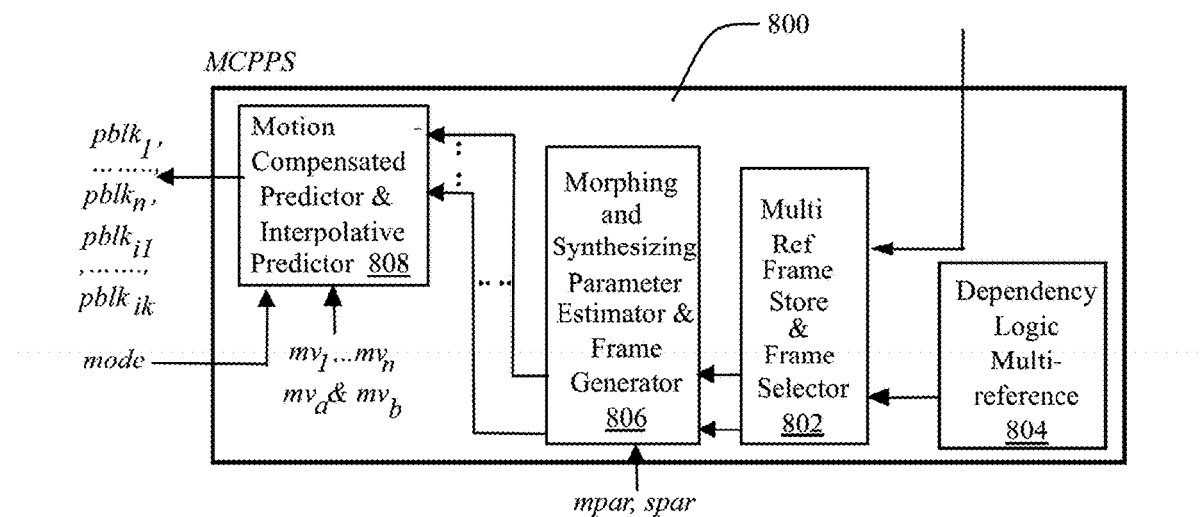
FIG. 8 is an illustrative diagram of an example decoder subsystem.

Referring to FIG. 8, a decoder subsystem 800 (motion compensator and predictor picture store (MCPPS) may include a portion of a decoder that corresponds to the portion of the encoder forming subsystem 700 (FIG. 7), and represents how a modified prediction signal is generated in P- and B-pictures at the decoder. As in the case of subsystem 700, for the sake of clarity, some details such as scaling and sign inversion of motion vectors for calculating prediction in direct mode, are omitted. Decoder subsystem 800 may have frame stores (Multi Reference Frame Stores & Frame/s Selector 802) that store decoded frames, its associated logic (Dependency Logic 804 for Mod Multi Ref Frames Pred) that allows indexing of frames from frame stores 802 and based on the modified multi ref prediction to be generated. The subsystem 800 also may have a unit 806 that actually computes morphed or synthesized prediction frames or blocks (referred to as the Morphing and Synthesizing Par Estimator & Frame Generator), and a motion compensated predictor (MC) predictor & MC interpolative predictor 808. The parameters mpar, and spar used for computing morphed or synthesized frames, are received at the decoder via the bitstream. The operation of frame lists and frame stores that enable access to the right frames in multi reference prediction, is the same or similar as that for the portion of encoding with subsystem 700.

Figure 9:
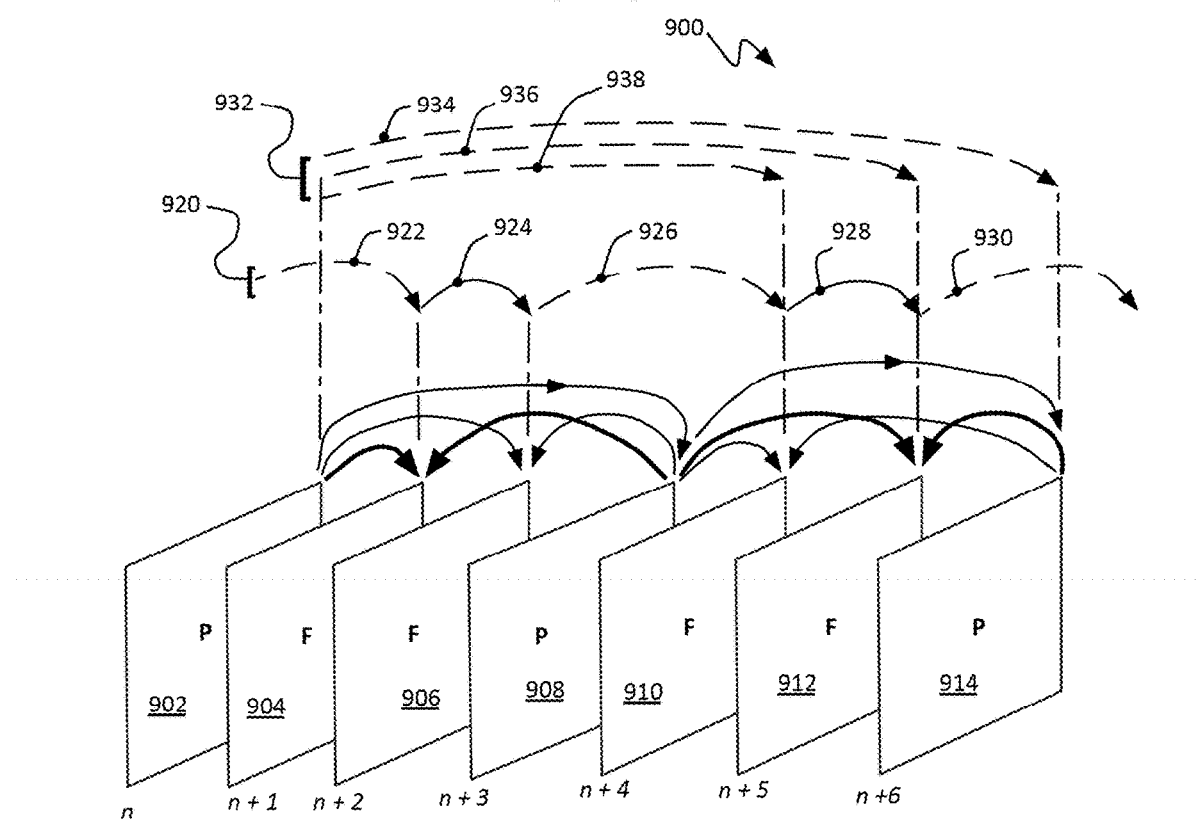
FIG. 9 is an illustrative diagram of a frame sequence demonstrating chained prediction and other prediction techniques.

Referring to FIG. 9, a chain strategy may be used with F-pictures (or it could also be used to extend to B-pictures), and that is referred to as chained prediction. The concept of chained prediction while it can apply to any picture-type, it is particularly relevant to F-pictures (and could also be applied to B-pictures). It is in fact an extension of the concept of multi reference prediction, with an additional caveat that it enables full prediction of F-pictures from other F-pictures including immediately previous coded F-pictures. Thus, chained prediction may increase prediction efficiency albeit at the cost of higher dependency of F-pictures on other F-pictures.

For instance, an IPFF picture coding structure 900 uses two F-pictures between each pair of anchor frames. Specifically, frames at time 'n' (902), 'n+3' (908), and 'n+6' (914) are coded as P-pictures, and frames at time 'n+1' (904), 'n+2' (906), 'n+4' (910), and 'n+5' (912) are coded as F-pictures. Emphasizing predictions used in F-pictures, the F-picture at time 'n+1' (904) uses an additional prediction from immediately previous F-picture (at time 'n−1', not shown) and indicated by arrow 922 on prediction chain 920). The F-picture at time 'n+2' (906) uses an additional prediction from immediately previous F-picture at time 'n+1' (904) indicated by arrow 924, while F-picture at time 'n+4' (910) uses an additional prediction from immediately previous F-picture at time 'n+2' (906) as indicated by arrow 926. The F-picture at time 'n+5' (912) uses an additional prediction from immediately previous F-picture at time 'n+4' (910) indicated by arrow 928. This type of prediction of F-pictures is referred to as chained prediction.

Clearly, the chained prediction 920 has the potential of increasing compression efficiency as some F-pictures can be additionally predicted from immediately previous F-pictures. While this type of prediction can be thought of as a form of multi reference prediction, even in multi reference prediction, F-pictures (or B-pictures in standards) normally would only predict from previous decoded P-pictures.

However, chained F-pictures do represent a limitation in the sense of increased coding dependency that can cause some issues in gaining high performance efficiency in multithreading for software encoding/decoding. To address this, it is possible to restrict the chaining of pictures so that some but not all F-pictures use chained coding. An example of this is indicated by the solid arrows 924 and 928 in which F-picture at time 'n+2' (906) is chain coded with respect to F-picture at 'n+1' (904) as indicated by solid arrow 924, and F-picture at time 'n+5' (912) is chain coded with respect to F-picture at time 'n+4' (910) as indicated by solid arrow 928. However, F-pictures at time 'n+1' (904) and 'n+4' (910) may not be chain coded as indicated by dashed arrows 922, 926, and 930 which would be omitted in this case. Alternatively in chain coding, the reverse is also possible where the dashed arrows 922, 926, 930 are present, while solid arrows 924 and 928 are omitted so that F-pictures at time 'n+1' (904) and 'n+4' (910) may be chain coded, but F-pictures at 'n+2' (906) and 'n+5' (912) may not be chain coded. In fact, this would allow encoding/decoding on separate threads for F-pictures at 'n+1' (904), and 'n+2' (906), and likewise for 'n+4' (910), and 'n+5' (912).

Next, picture structure 900 may also combine modified multi-reference coding 932 of this disclosure with chain coding 920 for F-pictures of this disclosure. F-pictures at 'n+4' (910), 'n+5' (912), and 'n+6' (914) are shown using a combination of chain coding and multi-reference coding. The multi-reference coding exists because F-pictures 910, 912, and 914 each use P-picture 902 as an additional reference frame. As shown by dashed arrows 934, 936, and 938. It will be understood that these principles can also be applied to normal multi reference coding of H.264 combined with chain coding for B-pictures.

It will also be understood that the chain and multi-reference options may be present in any combination, whether an entire chain is present or only parts along the chain are present. Thus, for the case of combined multi reference and chained coding, a compromise between coding efficiency gain and increased dependency may be reached by using chaining of F-pictures selectively (such that, say only half of the F-pictures are chained). Thus, the multi-reference dependencies may be provided with the solid arrow dependencies 924 and 928 as explained above, where F-picture at 'n+5' is chained to 'n+4', and 'n+2' is chained to 'n+1', but F-pictures at 'n+1' and 'n+4' are not chained. As noted earlier, another alternative would be the opposite of the chaining shown, in other words, where the dashed arrows are present while the solid arrows are not so that F-picture at 'n+1' could be chained to 'n−1', and likewise, F-picture at 'n+4' could be chained to 'n+2', but where F-pictures at 'n+2' and 'n+5' may not be chained.

Figure 10:
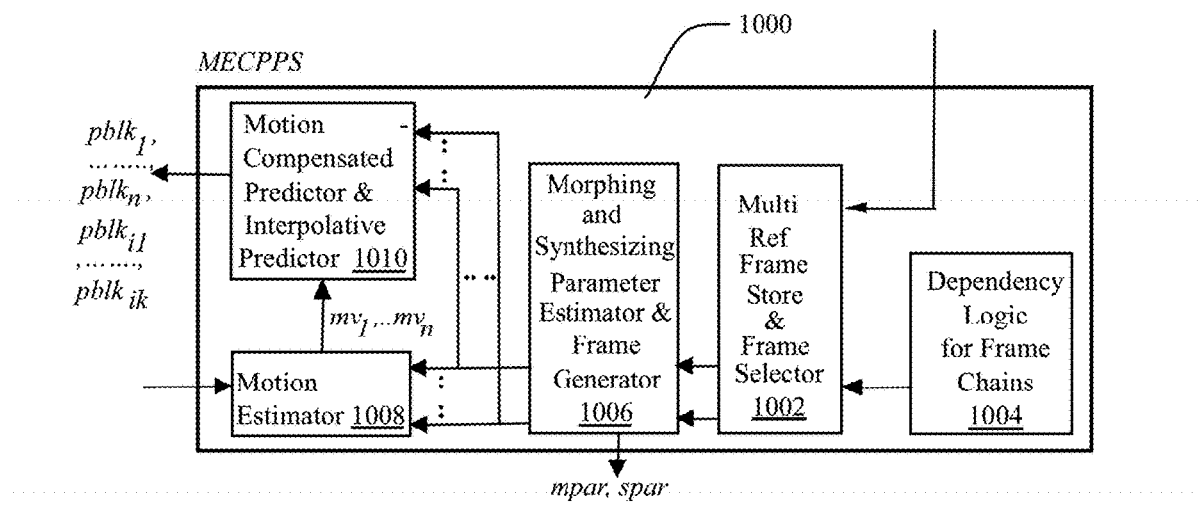
FIG. 10 is an illustrative diagram of an example encoder subsystem.

Referring to FIG. 10, an encoder subsystem 1000 referred to as 'Motion Estimator, Compensated Predictor and Picture Store (MECPPS)' that is used for generating the predictions for content adaptive P-pictures, and F-Pictures herein. In the interest of keeping the focus on core concepts, some simplifications have been done such as operations for calculation of direct mode (used for 'prediction', and as a default for 'skip' mode) are not shown. Encoder subsystem 1000 may comprise frame stores (Multi Reference Frame Stores & Frame/s Selector) 1002 that store decoded frames, its associated logic (Dependency Logic for Mod Multi Ref Frames incl Chained Pred) 1004 that allows indexing of frame from frame stores based on the modified multi ref prediction including chained prediction as needed, and the unit 1006 that actually computes morphed or synthesized prediction (Morphing and Synthesizing Par Estimator & Frame Generator) frames or blocks, the motion estimator (Motion Estimator) 1008, and motion compensated predictor (Motion Compensated (MC) Predictor & MC Interpolative Predictor) 1010. The parameters mpar, and spar used for computing morphed or synthesized frames, are sent to the decoder. The end result at the encoder is generation of a number of modified prediction candidates to choose from, and to choose for application on a block. Some of these candidates may be actual modified prediction blocks (pblk1, . . . pblkn), and the others may be interpolated modified prediction blocks (pblki1, . . . pblkik) by combining actual modified blocks, or blocks generated from direct prediction modes.

Figure 11:
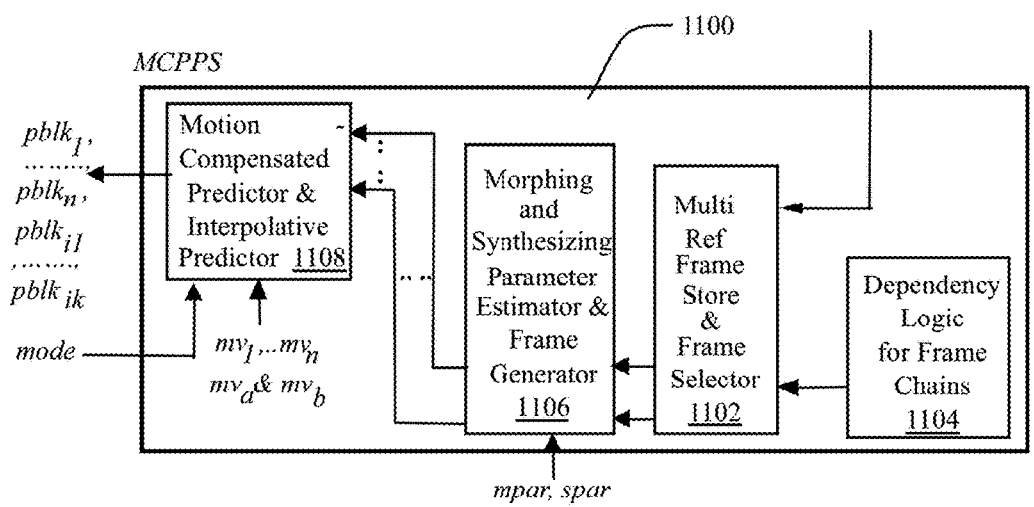
FIG. 11 is an illustrative diagram of an example decoder subsystem.

Referring to FIG. 11, a decoder subsystem 1100 may comprise frame stores (Multi Reference Frame Stores & Frame/s Selector) 1102 that store decoded frames, its associated logic (Dependency Logic for Mod Multi Ref incl Chained Frame Pred) 1104 that allows indexing of frame from frame stores based on the modified multi ref prediction including chained prediction as needed, and the unit 1106 that actually computes morphed or synthesized prediction (Morphing and Synthesizing Par Estimator & Frame Generator) frames or blocks, and motion compensated predictor (Motion Compensated (MC) Predictor & MC Interpolative Predictor) 1108. The parameters mpar, and spar used for computing morphed or synthesized frames, are received at the decoder via the bitstream. The indexing of frame stores that enable access to the right frames in multi reference prediction, may be the same or similar as that for encoder subsystem 1000.

Figure 12:
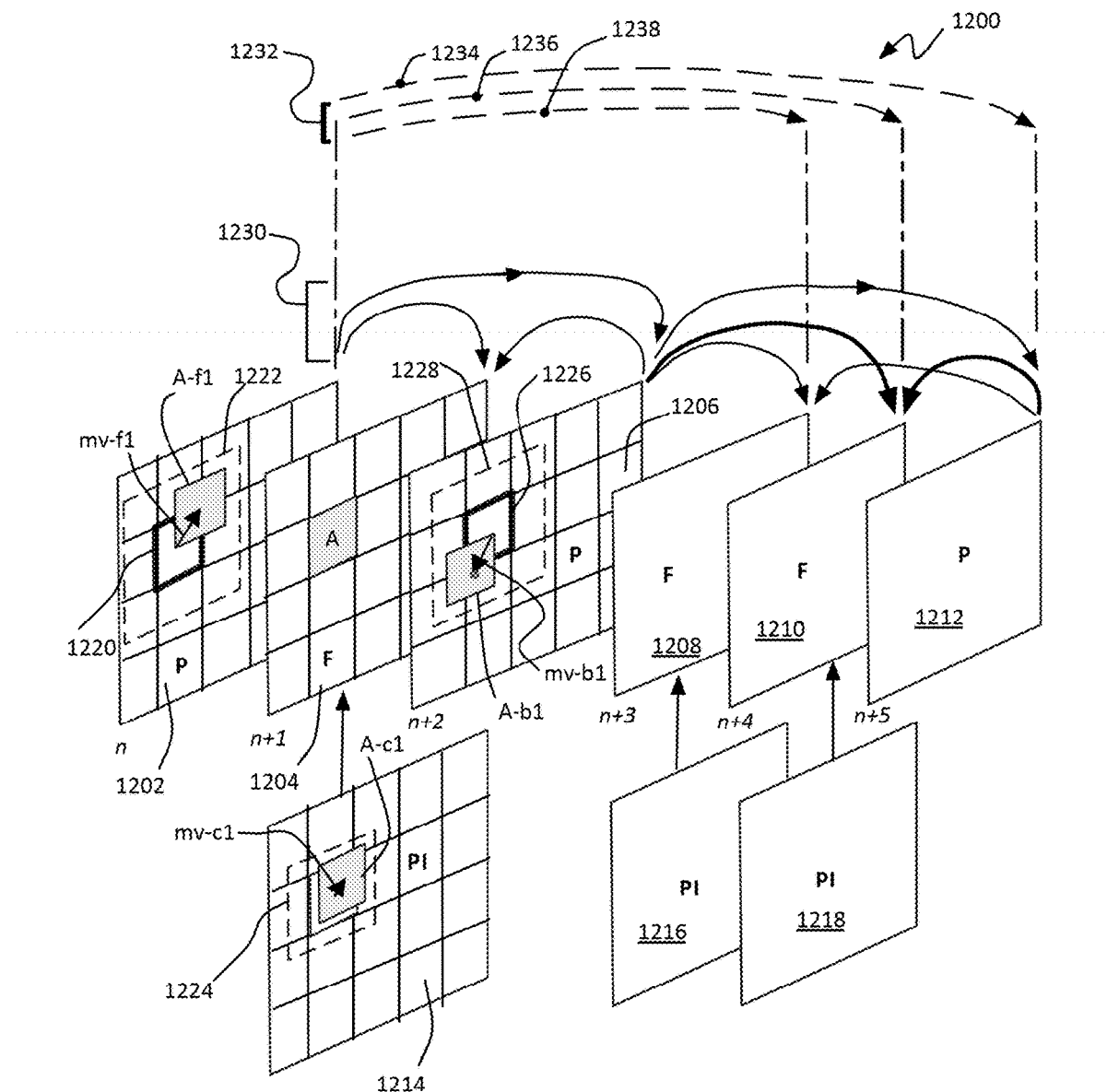
FIG. 12 is an illustrative diagram of a frame sequence demonstrating projected interpolation and other prediction techniques.

Referring to FIG. 12, a picture sequence 1200 with frames 1202 to 1212 numbered evenly is provided to illustrate the principle of generation and use of projected interpolation frames (PI-pictures). For simplicity, assume that F-pictures behave like B-pictures and can reference two anchors, one in the past, and another in the future (this is only one example case). Then, for every F-picture, a co-located interpolated frame can be generated by a specific type of interpolation referred to as projected interpolation using the future and the past reference anchor frames. Projected interpolation takes object motion into account that has non-constant (or non-linear) velocity over a sequence of frames, or relatively large motions. PI uses weighting factors depending on the distance from the co-located or current frame to be replaced and to each of the two reference frames being used for the interpolation. Thus, a best fit motion vector is determined that is proportional to these two distances, with the closer reference usually given more weight. To accomplish this, a two scale factor (x factor and y factor) are determined by least square estimations for one example. Further motion compensation may then be allowed to adjust small mismatches.

For instance, for F-pictures at time 'n+1' (1204), a PI-picture 1214 is generated co-located at this time using anchor or reference frames at times 'n' (1202) and 'n+2' (1206). Likewise for F-pictures at times, 'n+3' (1208), and 'n+4' (1210), corresponding PI-pictures 1216 and 1218 can be generated using anchor frames at times 'n+2' (1206) and 'n+5' (1212). This process may repeat for each future F-picture as a PI-picture is synthesized to correspond in time to each F-picture. The corresponding synthesized PI-pictures 1214, 1216, and 1218 can then be used as a third reference in the same or similar way the two reference anchors were going to be used for prediction. Some prediction partitions may use prediction references directly while others may use them implicitly such as to generate bi-prediction. FIG. 12 also shows that multi-reference prediction 1232 (shown with dependencies 1234, 1236, and 1238 in dashed line as optional) can be combined with the normal prediction 1220 and the PI-picture prediction. Thus, synthesized PI-pictures can be used for prediction, instead of the original F-pictures, with multi-reference prediction and with two reference anchors.

As shown, once the PI-picture is established, motion estimation between, for example, blocks 1224 on the PI-picture 1214, and blocks 1222 and 1228 on reference frames 1202 and 1206 may be used to determine the motion vector mv-c1 on PI-picture 1214 for movement of the partition or block A-c1 on the PI-picture 1214, and from locations 1220 and 1226 on the reference frames by the example method mentioned above.

Figure 13:
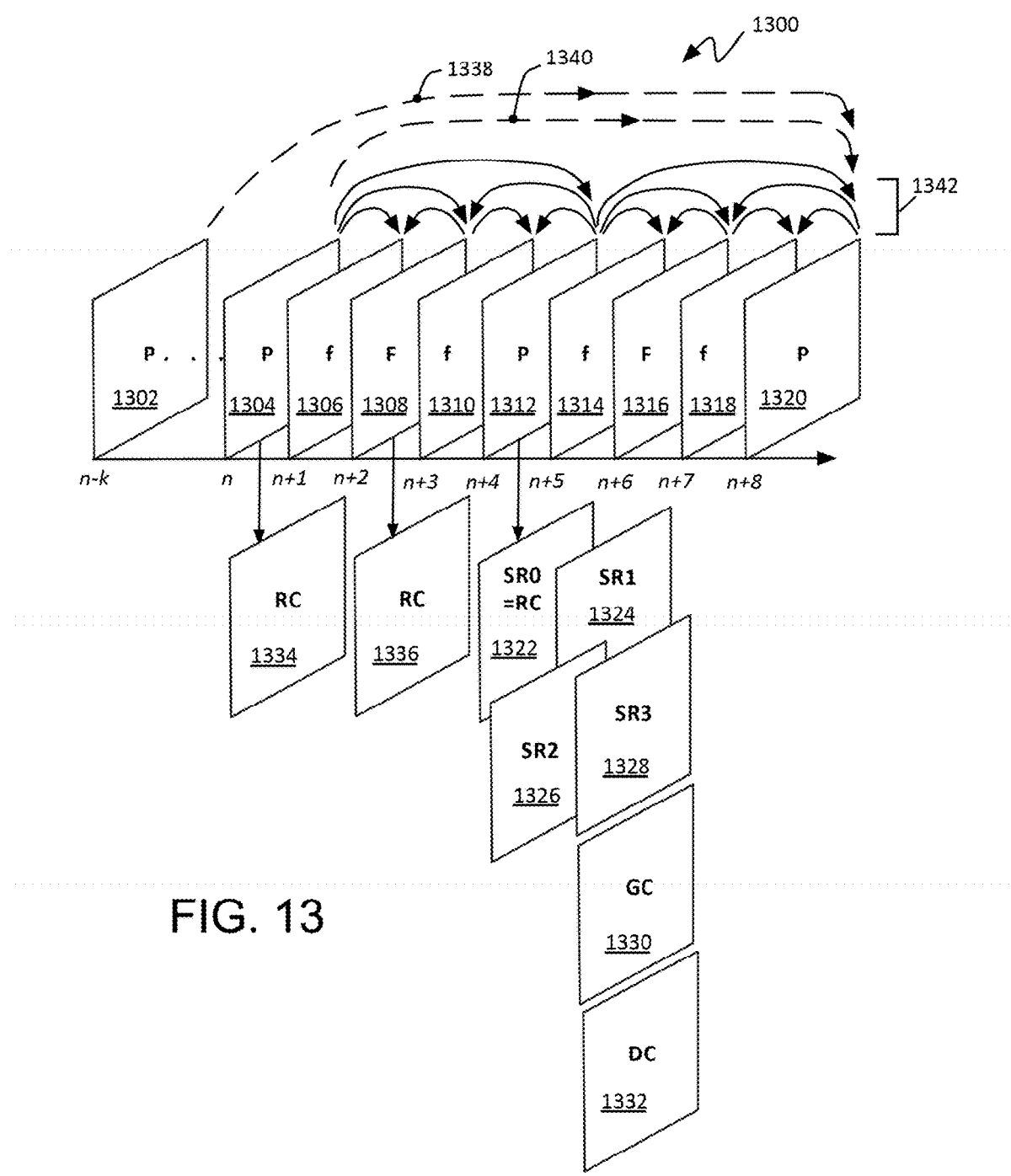
FIG. 13 is an illustrative diagram of a frame sequence demonstrating various types of reference frames.

Referring to FIG. 13, an example picture group structure 1300 with at least frames or pictures 1302 to 1320 numbered evenly shows F-pictures 1306, 1308, and 1310 between P-pictures 1304 and 1312, and F-pictures 1314, 1316, and 1318 between P-pictures 1312 and 1320. The picture group 1300 uses various modified (morphed or synthesized) multi reference predictions. Specifically, the example picture structure 1300 shows one example of all modified reference prediction types combined together. For instance, for coding of P-picture at time 'n+8' (1320), registration compensated RC (same as first quarter super resolution, SR0) picture at time 'n+4' (1322), three other SR pictures SR1 (1324), SR2 (1326), and SR3 (1328) each representing one quarter resolution, gain compensated frame GC (1330), and dominant/global motion compensated frame DC (1332), all corresponding to the same time 'n+4', registration compensated frame RC (1336) at time interval 'n+2', and registration compensated RC frame (1334) at time 'n', are all available for use as prediction references. Further, multi-reference prediction for P-pictures also is shown by dashed arrows 1338 and 1340. Also, in this picture configuration, every fourth picture is shown as a P-picture, and coding of pictures employs a two level hierarchical/pyramid structure 1342, and all non-reference F-pictures (that are not used for predicting other pictures) are shown as small case 1-pictures' as compared to capital letter F-pictures that are used as a reference. In other words, in the pyramid strategy, there are at least two levels where an F-picture has a previous reference frame and a subsequent reference frame, and at least one of those two reference frames is an F-picture with its own previous and subsequent reference frames. There may be more levels than two, and in one form one to four. The pyramid prediction also may be characterized as multi-reference prediction for F-pictures.

Figure 14:
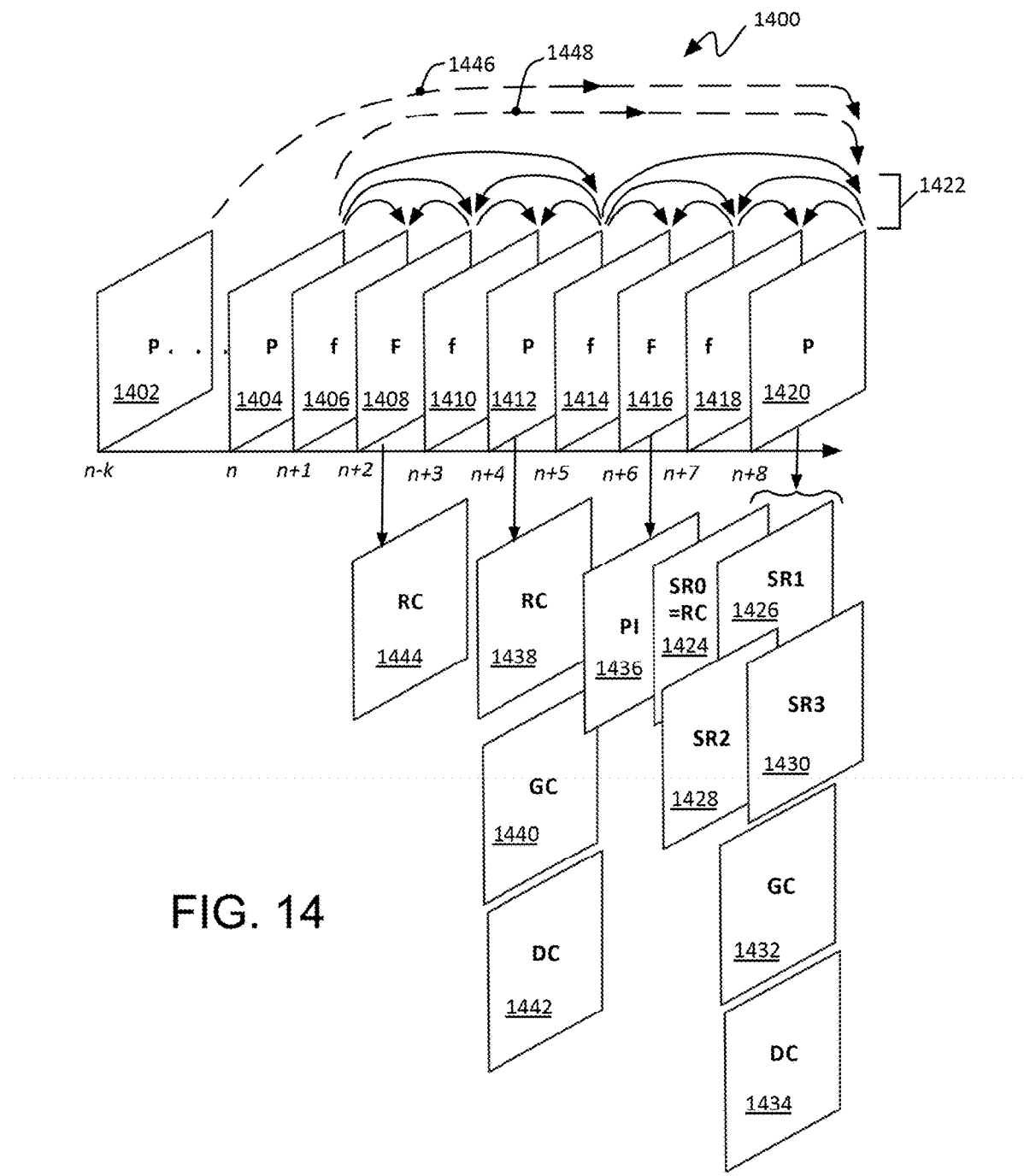
FIG. 14 is an illustrative diagram of another frame sequence demonstrating various types of reference frames.

Referring to FIG. 14, another example picture group 1400 has at least frames 1402 to 1420 numbered evenly, and uses a two level hierarchical/pyramid configuration 1422 and multi-reference predictions for F-pictures. For instance to predict F-picture at time 'n+6' (1416), SR0 (same as registration compensated RC prediction) (1424) and three other super resolution frames (or blocks), SR1 (1426), SR2 (1428), and SR3 (1430), gain compensated GC prediction (1432), and dominant motion compensated DC prediction (1434), all as a subsequent reference frame at time 'n+8', as well as PI-picture at time 'n+6' (1436) at the current time, and at a previous time, registration compensated RC (1438), gain compensated GC (1440), and dominant motion compensated DC prediction frame (1442) at time 'n+4', and at an even more previous time, registration compensated prediction RC (1444) at time 'n+2' (although the arrow is not shown) can all be used as reference frames instead of, or in addition to, their corresponding frames in the main sequence. Multi-reference P-picture prediction is also shown by dashed arrows 1446 and 1448.

Figure 15:
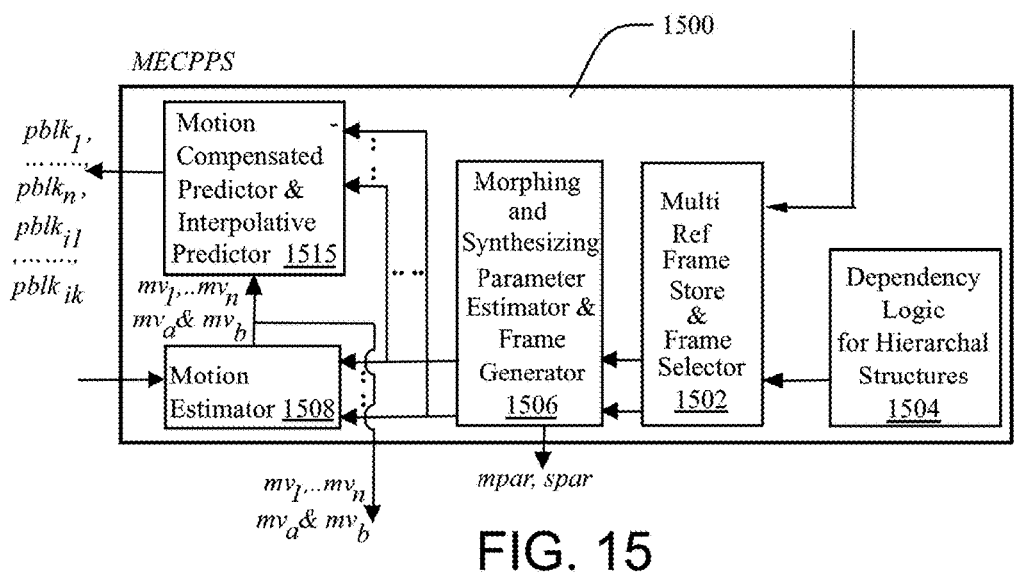
FIG. 15 is an illustrative diagram of an example encoder subsystem.

Referring to FIG. 15, an encoder subsystem 1500 may be provided with a modified (morphed or synthesized) multi reference and hierarchical picture coding structure motion estimation and compensated prediction subsystem, also referred to as 'motion estimator, compensated predictor and picture store (MECPPS) that is used for generating the predictions for content adaptive P-pictures, and F-pictures herein. In the interest of keeping the focus on core concepts, some simplifications have been performed such as operations for calculation of direct mode (used for 'prediction', and as a default for 'skip' mode) are not shown. Subsystem 1500 has components, such as frame stores (Multi Reference Frame Stores & Frame/s Selector) 1502 that store decoded frames, its associated dependency logic 1504 for hierarchical picture group structure or simply hierarchal structure dependencies, and that allows indexing of frames from the frame stores 1502 based on the modified multi ref prediction within F-picture pyramid hierarchy as needed, and a morphing and synthesizing unit 1506 that actually computes morphed or synthesized prediction (Morphing and Synthesizing Par Estimator & Frame Generator) frames or blocks, the motion estimator (Motion Estimator) 1508, and motion compensated predictor (Motion Compensated (MC) Predictor & MC Interpolative Predictor) 1510.

The parameters mpar, and spar used for computing morphed or synthesized frames, are sent to the decoder. The end result at the encoder is generation of a number of modified prediction candidates to choose from for a block, some of these candidates are actual modified prediction blocks (pblk1, ... pblkn), and the others are interpolated modified prediction blocks (pblki1, ... pblkik) by combining actual modified blocks, or blocks generated from direct prediction modes.

Figure 16:
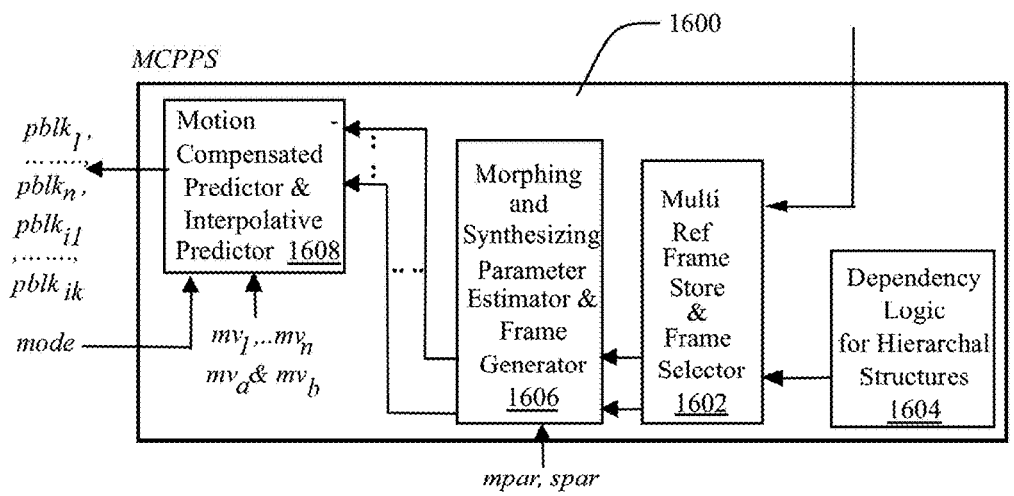
FIG. 16 is an illustrative diagram of an example decoder subsystem.

Referring to FIG. 16, a decoder subsystem 1600 may be provided with modified (morphed or synthesized) multi reference and hierarchical picture coding structure motion compensated prediction subsystem. The decoder subsystem 1600 has components, such as frame stores (Multi Reference Frame Stores & Frame/s Selector) 1602 that store decoded frames, its associated dependency logic (Dependency Logic for Mod Multi Ref in Hierarchical Picture Group Structure) 1604 that allows indexing of frame from frame stores based on the modified multi ref prediction in F-pictures pyramid hierarchy as needed, and a morphing and synthesis unit 1606 that actually computes morphed or synthesized prediction (Morphing and Synthesizing Par Estimator & Frame Generator) frames or blocks. The subsystem 1600 may also have motion compensated predictor (Motion Compensated (MC) Predictor & MC Interpolative Predictor) 1608. The parameters mpar, and spar used for computing morphed or synthesized frames, are received at the decoder via the bitstream. The indexing of frame stores that enable access to the right frames in multi reference prediction, is the same or similar as that for the portion of encoding shown in subsystem 1500.

Figure 17:
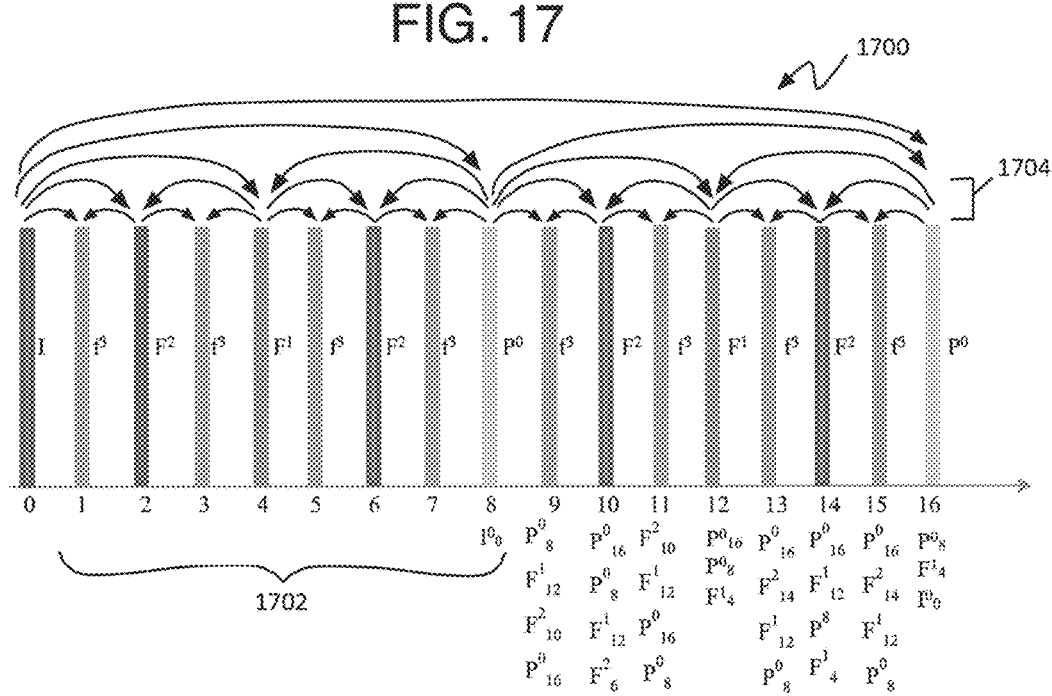
FIGS. 17-21 are charts showing the dependency and hierarchy among frames along a sequence of frames.

Referring to FIGS. 17-21, picture groups are shown in various pyramid structures, and the notation for the hierarchy is explained. Referring to FIG. 17, a detailed example showing coding of video sequence 1700 with repeating picture groups 1702 of eight pictures. Each frame or picture is numbered 1-16, in order of display and not in the order of coding, and labeled with a picture type (I, P, F, or f) where capital F indicates the F-picture may be used as a reference frame, and the small F-picture is not used as a reference frame. The superscript on the picture type notation indicates which pyramid or hierarchy level or rank the frame resides, thereby indicating the reference frame dependencies also shown by the dependency arrows 1704. An index 1706 is provided below pictures 8-16 to show which multi-reference frames or pictures may be used as references for the picture number it is underneath. The superscript number is as mentioned above, and the subscript number is the frame number in display order (not coding order). For example, picture 8 may only be predicted by, or in other words it depends on, $I_0^0$ (which may also be referred to as I00) while picture 16 may be predicted by, or depends on, at least one, but otherwise any combination of $P_8^0$, $F_1^4$, and $I_0^0$ as shown down the column under picture 16 depending on whether the prediction is in multi-mode or inter-mode as explained herein. Such an index may be used and/or stored by the dependency logic module 128 or any of the dependency logic modules mentioned herein.

This content adaptive P- and F-picture coding here uses the fixed Picture Group (PG) (1702) of size 8 that includes a P-picture (rank 0) 8 or 16, and a three level pyramid hierarchy of F-pictures, with one (rank 1) reference F-picture 4 or 12 in a first level of the hierarchy, two (rank 2) reference F-pictures ((2 and 6) or (10 and 14)) in a second level of the hierarchy, and four non-reference (rank 3) f-pictures (1, 3, 5, 6 or 9, 11, 13, 15) in a third level of the hierarchy. For each picture in this picture group, reference frame dependency for multi reference prediction, are also shown. For instance, frame at time '16 ' is coded as a P-picture after coding of the first 8 frame is complete, and is coded as P-picture (P016 ). Its coding dependency is shown underneath it as explained above. As can be noted, superscript refers to the rank order of a frame, and subscript refers to the time where the frame is located.

Also in conjunction with picture group 1700, an example rank order hierarchy of each picture and dependencies for Modified Multi Ref Prediction is shown below (the modified references are not shown on FIG. 17). The example of modified multi reference prediction is shown for the multi reference P- and F-pictures in the sequence 1700 and modified to generate morphed frames for prediction references, or to generate synthesized frames for prediction references.

Modified Multi Ref predictions for $P^0_{16}$ and $F^1_{12}$

1. $P^0_{16}$ modified multi ref predictions for 'inter' mode:
   MR0$n$=SR0($P^0_8$), MR1$n$=RC($F^1_4$), MR2$n$=RC($I^0_0$),
   MR3$n$= . . . , MR5$n$=SR1($P^0_8$), MR6$n$=SR2($P^0_8$),
   MR7$n$=SR3($P^0_8$), MR0$d$=DC($P^0_8$), MR0$g$=GC($P^0_8$)

2. $F^1_{12}$ modified multi ref predictions for 'inter' mode:
   MR0$n$=RC($P^0_8$), MR7$n$=PI($F^1_{12}$), MR3$n$=SR0($P^0_{16}$),
   MR1$n$=RC($F^1_4$), MR5$n$=SR1($P^0_{16}$), MR6$n$=SR2($P^0_{16}$), MR7$n$=SR3($P^0_{16}$), MR0$d$=DC($P^0_8$), MR3$d$=DC($P^0_{16}$), MR0$g$/MR3$g$=GC($P^0_8$)/GC($P^0_{16}$)

These example codes (or codebook entries) may be used for the indexing tables used by the dependency logic modules described herein and to track the dependencies of predicted frames to their modified reference frames, and to track the relationships among any of the frames. Tables 1-3 below provide further example codes that may be used. As to the code for a modified reference, M stands for modified, and the code R# (such as R0, R1, R2, and so forth) is the reference frame number of previously decoded frames (in coding order that can be modified by either morphing or synthesis) for a current frame or picture (curr_pic) being analyzed. The number refers to the count of reference frames in coding order (not display order) and relative to each other as the frame is spaced away from the current frame being analyzed. The closest frame to the current frame is R0. In one form, this count only includes reference frames to be modified and does not include any other interspersed F-picture or B-picture along the sequence. Also, two different counts may exist, one for counting reference frames that extend before the time of the current frame (past) in the coding order, and one for reference frames that are to be coded after the current frame in the coding order (future). When a parameter is provided for the modification, and to be encoded for example for subsequent decoding and reconstruction of the modified frame, the compensation type may be indicated as type b (blur), g (gain), r (registration), d (dominant or global motion), or n (for no parameter available with the modified reference frame).

In the example provided above then, frame $P^0_{16}$ has nine possible reference frames where MR0$n$=SR0($P^0_8$) refers to at modified frame R0 at time and rank $P^0_8$ and relative to the current frame $P^0_{16}$, no parameters are provided, and the modified reference frame R0 is a super resolution frame (or first block or first quarter) numbered 0 (SR0). MR1n=RC($F^1_4$) refers to modified frame R1, has no parameters, and is a registration compensated frame at time and rank $F^1_4$. No parameters may be indicated in this case when registration was already ideal and compensation is not needed. From this it will be easy to understand the other examples. It will also be understood, as mentioned above, that a single frame or instant in time may have multiple modified references, hence the multiple MR0 frames for the $P^0_{16}$ frame. These same codes apply to the nine modified frames for current frame $F^1_{12}$ as well.

Figure 18:
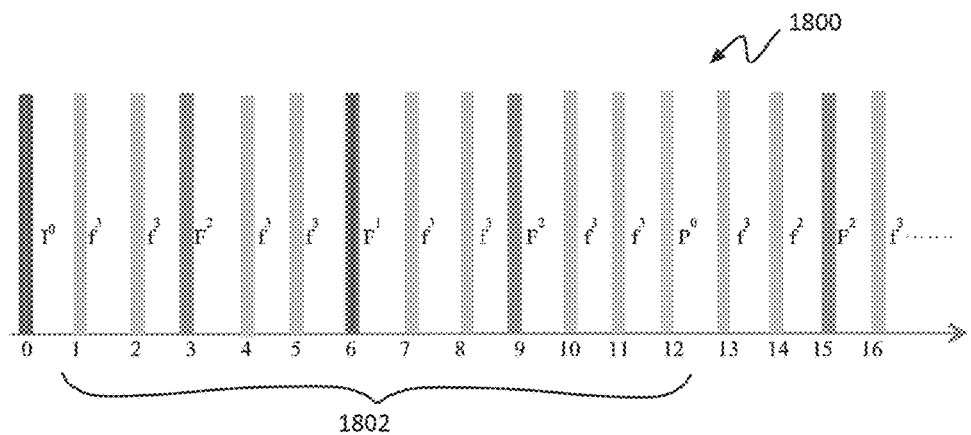

Referring to FIG. 18, a sequence 1800 is an alternative to video sequence 1700, and is an example video sequence 1800 showing coding of video with a repeating picture group 1802 of twelve pictures or frames showing rank order hierarchy of each picture in modified multi reference prediction. The picture group 1802 of twelve frames uses one P-picture (rank 0) per picture group (here P012), and a three level F-picture hierarchy that has one (rank 1) F-picture in the first level of hierarchy (F16), two (rank 2) F-pictures (F23 and F29) in the second level of the hierarchy, and eight non-reference (rank 3) f-pictures in the third level of the hierarchy between each pair of anchor (or reference) frames. In the illustrated example, two f-pictures (F31 and F32 for example) are between two anchor frames (I00 and F23 for example), and the pattern is repeated along the sequence. Otherwise, detailed dependencies for multi reference predictions and actual modified predictions while not shown follow logic similar to that of video sequence 1700 (FIG. 17).

Figure 19:
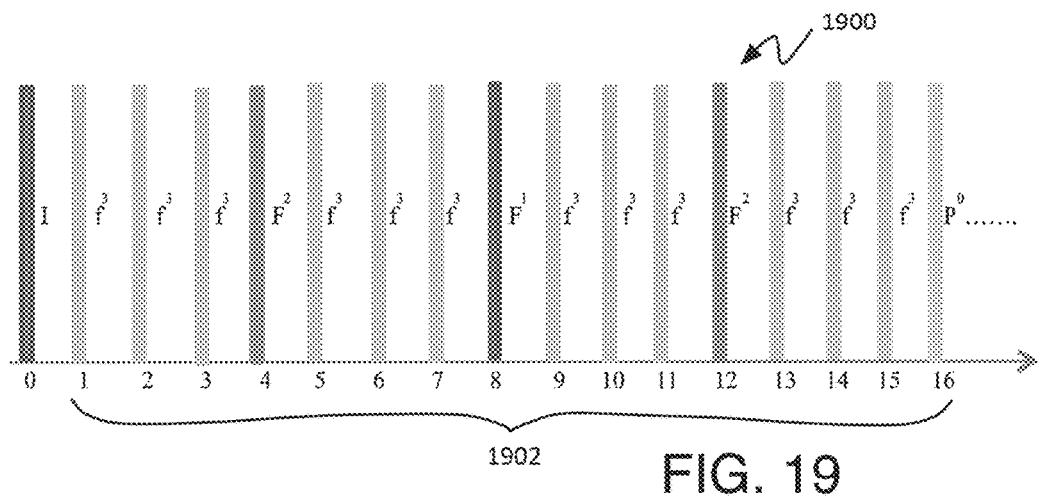

Referring to FIG. 19, another example alternative video sequence 1900 shows coding of video with repeating picture group 1902 of sixteen pictures using a first pattern 1904 showing rank order hierarchy of each picture in modified multi reference prediction. The picture group 1902 of sixteen frames uses one P-picture (rank 0) per picture group (such as P016), and a three level F-picture hierarchy that has one (rank 1) F-picture in the first level of hierarchy (F18), two (rank 2) F-pictures in the second level of hierarchy (F24 and F212), and twelve non-reference (rank 3) f-pictures with three f-pictures in the third level of the hierarchy between each pair of anchor frames. For example, level 3 frames, F35, F36, and F37 are located between level 2 frame F24 and level 1 frame F18. Detailed dependencies for multi reference predictions and actual modified predictions while not shown follow logic similar to that of video sequence 1700 (FIG. 17).

Figure 20:
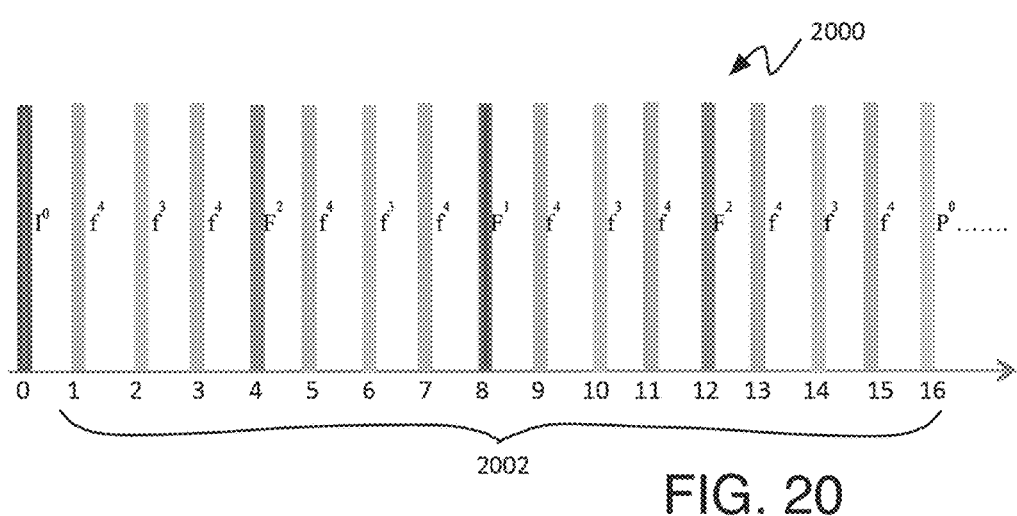

Referring to FIG. 20, an example video sequence 2000 shows coding of video with repeating picture group 2002 of sixteen pictures using a second pattern showing rank order hierarchy of each picture in modified multi reference prediction. For the second pattern of picture group 2002, a four level hierarchy is used instead of the three level hierarchy used in video sequences 1700, 1800, and 1900. Here, picture group 2002 uses one P-picture (rank 0) P016 per picture group, and a four level F-picture hierarchy that has one (rank 1) F-picture in the first level of hierarchy (F18), two (rank 2) F-pictures in the second level of hierarchy (F24 and F212), four (rank 3) F-pictures in the third level of hierarchy (such as F32, F36, F310, and F314), and eight non-reference (rank 4) f-pictures with one f-picture in the fourth level of the hierarchy and between each pair of anchor frames. For example, F411 is anchored by F310 and F212. Detailed dependencies for multi reference predictions and actual modified predictions while not shown follow logic similar to that of video sequence 1700 (FIG. 17).

Figure 21:
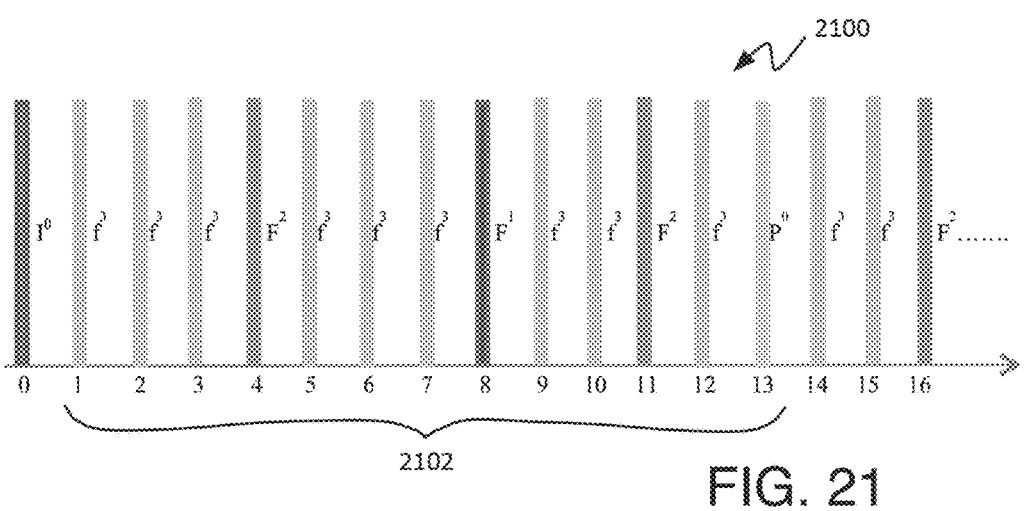

Referring to FIG. 21, an example video sequence 2100 shows coding of video with repeating picture group 2102 having a variable number of pictures showing rank order hierarchy of each picture in modified multi ref prediction. Picture group 2102 has a structure with a variable number of frames including a P-picture (P013), and a three level F-picture hierarchy. The first level of the hierarchy has a one (rank 1) F-picture (F18), and two (rank 2) F-pictures at the second level of hierarchy (F24 and F211). At the third level of the hierarchy, the sequence 2102 has nine (rank 3) f-pictures. Out of the nine f-pictures in this picture group, the first three level 3 f-pictures (F31, F32, and F33) are located between a pair of anchor frames (100 and F24), followed by another three level 3 f-pictures (F35, F36, and F37) between the next pair of anchor frames (F24 and F18), followed by two level 3 f-pictures between anchor pair (F18 and F211) and one level 3 f-picture (F312) between anchor pair (H211 and P013). The length of each picture group is variable and may in fact depend on the content itself. Otherwise, detailed dependencies for multi reference predictions and actual modified predictions while not shown follow logic similar to that of video sequence 1700 (FIG. 17).

Various prediction modes are allowed in P- and F-pictures and are exemplified below, along with how they relate to the reference types. Both the P-picture and F-picture tiles are partitioned into smaller units, and a prediction mode from among "skip", "auto", "inter", and "multi", is assigned to each partition of a tile. The entire list of modes in Table 1 also includes 'intra' that refers to spatial prediction from neighboring blocks as compared to temporal motion compensated prediction. The "split" mode refers to a need for further division or further partitioning. For partitions that use "inter" or "multi" mode, further information about the used reference is needed and is shown for P-pictures in Table 3(a) and Table 3(b) respectively, while for F-pictures, in Table 4(a) and Table 4(b) respectively.

Prediction modes and reference types analyzer 125 (FIG. 1) may allow for selection of prediction modes from among, "skip", "auto", "inter", "multi", and "intra" as mentioned above, and for each partition of a tile, all of which may apply to P- and F-pictures; this is shown in Table 1 below. In addition to prediction modes, it also allows for selection of reference types that can be different depending on "inter" or "multi" mode, as well as for P- and F-pictures; the detailed list of ref types is shown in Tables 2(a) and 2(b) for P-pictures, and Tables 3(a), 3(b), 3(c), and 3(d) for F-pictures.

Tables 1 through 3(d), shown below, illustrate one example of codebook entries for a current frame (curr_pic) being, or that will be, reconstructed. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

Table 1 Prediction Modes for Partitions of a Tile in P- and F-Pictures (Already Explained Above):

| No. | Prediction mode |
|---|---|
| 0. | Intra |
| 1. | Skip |
| 2. | Split |
| 3. | Auto |
| 4. | Inter |
| 5. | Multi |

Table 2(a) Ref Types for Partitions of Tile that have "Inter" Mode in P-Pictures:

| No. | Ref Types for partitions with "inter" mode |
|---|---|
| 0. | MR0n (=past SR0) |
| 1. | MR1n |
| 2. | MR2n |
| 3. | MR3n |
| 4. | MR5n (past SR1) |
| 5. | MR6n (past SR2) |
| 6. | MR7n (past SR3) |
| 7. | MR0d |
| 8. | MR0g |

Table 2(b) Ref Types for Partitions of Tile that have "Multi" Mode in P-Pictures:

| No. | Ref Types for partitions with "multi" mode (first Ref Past none, second Ref:) |
|---|---|
| 0. | MR1n |
| 1. | MR2n |
| 2. | MR3n | where table 2(b) is directed to a specific combination of references including a past reference without parameters and one of the references on the table as indicated by the table heading.

Table 3(a) Ref Types for Partitions of Tile that have "Inter" Mode in F-Pictures:

| No. | Ref Types for partitions with "inter" mode |
|---|---|
| 0. | MR0n |
| 1. | MR7n (=proj F) |
| 2. | MR3n (=future SR0) |
| 3. | MR1n |
| 4. | MR4n (=Future SR1) |
| 5. | MR5n (=Future SR2) |
| 6. | MR6n (=Future SR3) |
| 7. | MR3d |
| 8. | MR0g/MR3g | where proj F refers to PI, and line 8, by one example, includes two optional references.

Table 3(b) Ref Types for Partitions of Tile that have "Multi" Mode and Dir 0 in F-Pictures:

| No. | Ref Types for partitions with "multi" mode and Dir 0 (first Ref Past none, second Ref:) |
|---|---|
| 0. | MR3n (=future SR0) |
| 1. | MR1n |
| 2. | MR4n (=Future SR1) |
| 3. | MR5n (=Future SR2) |
| 4. | MR6n (=Future SR3) |
| 5. | MR7n (=proj F) |
| 6. | MR3d |
| 7. | MR3g | where Dir refers to a sub-mode that is a fixed, or partially fixed, combination of references for multi-mode for F-frames, such that Dir 0 above, and Dir 1 and Dir 2 below, each refer to a combination of references. Thus, as shown in Table 3(b), Dir 0 may refer to a combination of a past reference (which may be a particular reference at a particular time (reference 3 at n+2 for example) and combined with one of the references from the table. Dir on the tables below are similar and as explained in the heading of the table.

Table 3(c) Ref Types for Partitions of Tile that have "Multi" Mode and Dir 1 in F-Pictures:

| No. | Ref Types for partitions with "multi" mode and Dir 1 (first Ref MR0n, second Ref:) |
|---|---|
| 0. | MR7n (=proj F) |

Table 3(d) Ref Types for Partitions of Tile that have "Multi" Mode and Dir 2 in F-Pictures:

| No. | Ref Types for partitions with "multi" mode Dir 2 (first Ref MR3n, second Ref:) |
|---|---|
| o. | |
| . | MR7n (=proj F) |

Figure 22:
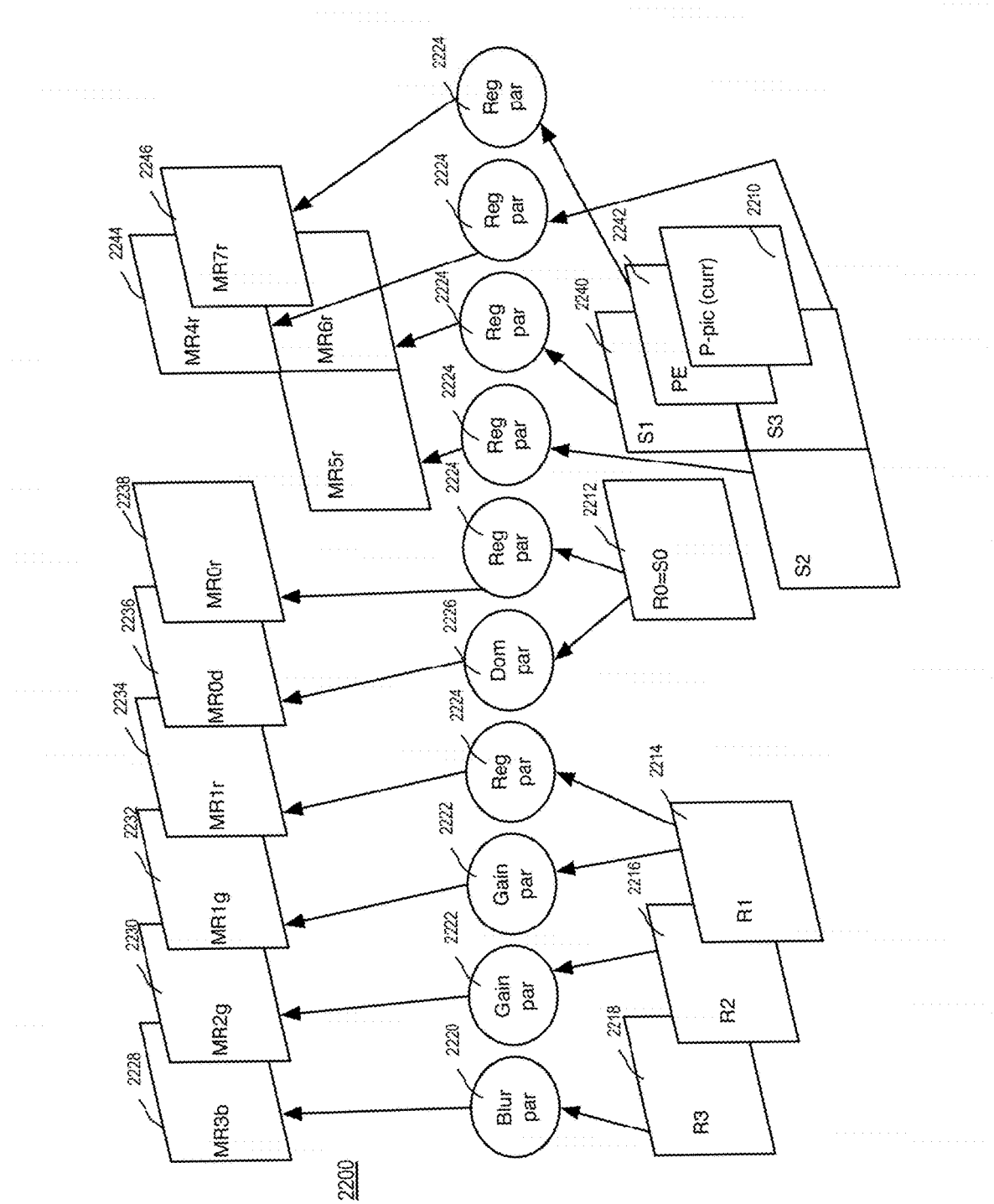
FIG. 22 is an illustrative diagram of example modified reference frames for the video coding system herein.

Referring to FIG. 22, an illustrative diagram of modified prediction reference pictures 2200, are arranged in accordance with at least some implementations of the present disclosure, and provides further examples uses of the codes. As shown, the output of quality analyzer and quality restoration filtering may be a final reconstructed frame that may be used for prediction for coding other frames (e.g., the final reconstructed frame may be a reference frame or the like).

The proposed implementation of the NGV coder (e.g., encoder 100 and/or decoder 200) may implement P-picture coding using a combination of Morphed Prediction References 2228-438 (MR0-3) and/or Synthesized Prediction References 2212 and 2240-446 (S0-S3, MR4-7). NGV coding involves use of three picture types referred to as I-pictures, P-pictures, and F-pictures. In the illustrated example, the current picture to be coded (a P-picture) is shown at time t=4. During coding, the proposed implementation of the NGV coder (e.g., encoder 100 and/or decoder 200) may use one or more of four previously decoded references R0 2212, R1 2214, R2 2216, and R3 2218. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based on such generated modified (morphed or synthesized) references.

As will be described in greater detail below, in some examples, the proposed implementation of the NGV coder (e.g., encoder 100 and/or decoder 200) may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, if inter-prediction is applied, a characteristics and motion filtering predictor module may apply motion compensation to a current picture 2210 (e.g., labeled in the figure as P-pic (curr)) as part of the local decode loop. In some instances, such motion compensation may be based at least in part on future frames (not shown) and/or previous frame R0 2212 (e.g., labeled in the figure as R0), previous frame R1 2214 (e.g., labeled in the figure as R1), previous frame R2 2216 (e.g., labeled in the figure as R2), and/or previous frame R3 2218 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 2220 (e.g., labeled in the figure as Blur par), changes in gain 2222 (e.g., labeled in the figure as Gain par), changes in registration 2224 (e.g., labeled in the figure as Reg par), and changes in dominant motion 2226 (e.g., labeled in the figure as Dom par), or the like with respect to a reference frame or frames with which it is to be coded.

The determined morphing parameters 2220, 2222, 2224, and/or 2226 may be used to generate morphed reference frames. Such generated morphed reference frames may be stored and may be used for computing motion vectors for efficient motion (and characteristics) compensated prediction of a current frame. In the illustrated example, determined morphing parameters 2220, 2222, 2224, and/or 2226 may be used to generate morphed reference frames, such as blur compensated morphed reference frame 2228 (e.g., labeled in the figure as MR3*b*), gain compensated morphed reference frame 2230 (e.g., labeled in the figure as MR2*g*), gain compensated morphed reference frame 2232 (e.g., labeled in the figure as MR1*g*), registration compensated morphed reference frame 2234 (e.g., labeled in the figure as MR1*r*), dominant motion compensated morphed reference frame 2236 (e.g., labeled in the figure as MR0*d*), and/or registration compensated morphed reference frame 2238 (e.g., labeled in the figure as MR0*r*), the like or combinations thereof, for example.

Similarly, a synthesizing analyzer and generation module may generate super resolution (SR) pictures 2240 (e.g., labeled in the figure as S0 (which is equal to previous frame R0 2212), S1, S2, S3) and projected interpolation (PI) pictures 2242 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 2220, 2222, 2224, and/or 2226 may be used to morph the generate synthesis reference frames super resolution (SR) pictures 2240 and/or projected interpolation (PI) pictures 2242. For example, a synthesizing analyzer and generation module may generate morphed registration compensated super resolution (SR) pictures 2244 (e.g., labeled in the figure as MR4*r*, MR5*r*, and MR6*r*) and/or morphed registration compensated projected interpolation (PI) pictures 2246 (e.g., labeled in the figure as MR7*r*) or the like from the determined registration morphing parameter 2224. Such generated morphed and synthesized reference frames may be stored and may be used for computing motion vectors for efficient motion (and characteristics) compensated prediction of a current frame.

In some implementations changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The proposed implementation improves video compression efficiency by improving interframe prediction, which in turn reduces interframe prediction difference (error signal) that needs to be coded. The less the amount of interframe prediction difference to be coded, the less the amount of bits required for coding, which effectively improves the compression efficiency as it now takes less bits to store or transmit the coded prediction difference signal. Instead of being limited to motion predictions only, the proposed NCV codec may be highly adaptive to changing characteristics (such as gain, blur, dominant motion, registration, resolution precision, motion trajectory, the like, or combinations thereof, for example) of the content by employing, in addition or in the alternative to motion compensation, approaches to explicitly compensate for changes in the characteristics of the content. Thus by explicitly addressing the root cause of the problem the NGV codec may address a key source of limitation of standards based codecs, thereby achieving higher compression efficiency.

This change in interframe prediction output may be achieved due to ability of the proposed NCV codec to compensate for a wide range of reasons for changes in the video content. Typical video scenes vary from frame to frame due to many local and global changes (referred to herein as characteristics). Besides local motion, there are many other characteristics that are not sufficiently addressed by current solutions that may be addressed by the proposed implementation.

The proposed implementation may explicitly compute changes in a set of characteristics (such as gain, blur, dominant motion, registration, resolution precision, motion trajectory, the like, or combinations thereof, for example) in addition to local motion, and thus may do a better job of prediction from previous picture/slices than only using local motion prediction from previous and next pictures/slices. Further, since there can be error in any estimation procedure, from multiple past or multiple past and future pictures/slices the NGV coder may choose the frame that yields the best by explicitly compensating for differences in various characteristics.

In particular, the proposed implementation of the NGV coder may include features: i. explicit compensation for changes in gain/brightness in a scene; ii. explicit compensation for changes in blur/sharpness in a scene; iii. explicit compensation for dominant motion in a scene; iv. explicit compensation for registration mismatches in a scene; v. explicit model for changes in resolution precision in a scene; and/or vi. explicit model for changes in motion trajectory in a scene.

In operation, the proposed implementation of the NGV coder (e.g., encoder 100 and/or decoder 200) may operate so that prediction mode and/or reference type data may be defined using symbol-run coding or a codebook or the like. The prediction mode and/or reference type data may be transform encoded using content adaptive or discrete transform in various examples to generate transform coefficients. Also as discussed, data associated with partitions (e.g., the transform coefficients or quantized transform coefficients), overhead data (e.g., indicators as discussed herein for transform type, adaptive transform direction, and/or a transform mode), and/or data defining the partitions and so on may be encoded (e.g., via an entropy encoder) into a bitstream. The bitstream may be communicated to a decoder, which may use the encoded bitstream to decode video frames for display. On a local basis (such as block-by-block within a macroblock or a tile, or on a partition-by-partition within a tile or a prediction unit, or fragments within a superfragment or region) the best mode may be selected for instance based on Rate Distortion Optimization (RDO) or based on pre-analysis of video, and the identifier for the mode and needed references may be encoded within the bitstream for use by the decoder.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of the systems described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

Figure 23:
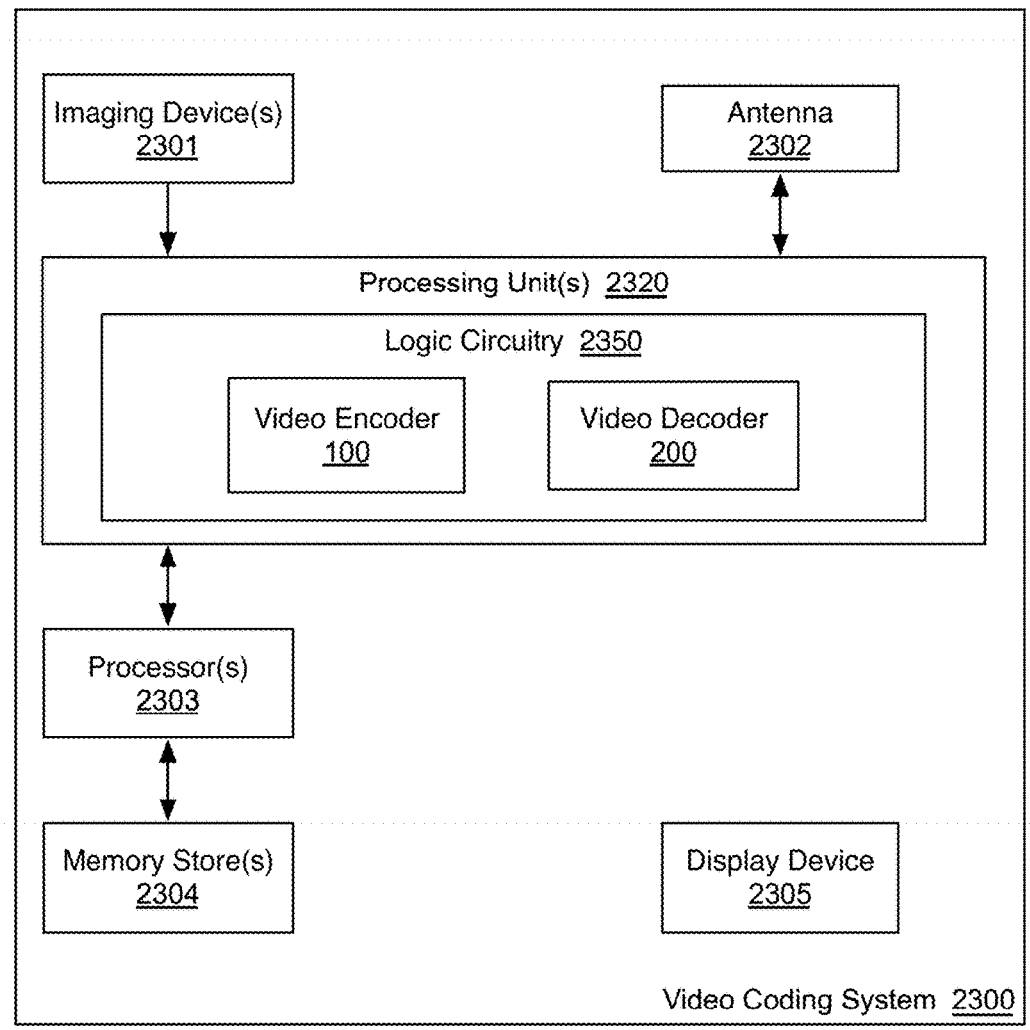
FIG. 23 is an illustrative diagram of an example video coding system.

FIG. 23 is an illustrative diagram of example video coding system 2300, arranged in accordance with at least some implementations of the present disclosure. In the illustrated implementation, video coding system 2300 may include imaging device(s) 2301, video encoder 100, video decoder 200 (and/or a video coder implemented via logic circuitry 2350 of processing unit(s) 2320), an antenna 2302, one or more processor(s) 2303, one or more memory store(s) 2304, and/or a display device 2305.

As illustrated, imaging device(s) 2301, antenna 2302, processing unit(s) 2320, logic circuitry 2350, video encoder 100, video decoder 200, processor(s) 2303, memory store(s) 2304, and/or display device 2305 may be capable of communication with one another. As discussed, although illustrated with both video encoder 100 and video decoder 200, video coding system 2300 may include only video encoder 100 or only video decoder 200 in various examples. Further, although described with respect to video encoder and/or video decoder, system 2300 may, in some examples, implement video encoder 700 of FIG. 7 and/or decoder 800 of FIG. 8.

As shown, in some examples, video coding system 2300 may include antenna 2302. Antenna 2302 may be configured to transmit or receive an encoded bitstream of video data, for example. Further, in some examples, video coding system 2300 may include display device 2305. Display device 2305 may be configured to present video data. As shown, in some example, logic circuitry 2350 may be implemented via processing unit(s) 2320. Processing unit(s) 2320 may include application-specific integrated circuit (ASIC) logic, graphics processor(s), general purpose processor(s), or the like. Video coding system 2300 also may include optional processor(s) 2303, which may similarly include application-specific integrated circuit (ASIC) logic, graphics processor(s), general purpose processor(s), or the like. In some examples, logic circuitry 2350 may be implemented via hardware, video coding dedicated hardware, or the like, and processor(s) 2303 may implemented general purpose software, operating systems, or the like. In addition, memory store(s) 2304 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 2304 may be implemented by cache memory. In some examples, logic circuitry 2350 may access memory store(s) 2304 (for implementation of an image buffer for example). In other examples, logic circuitry 2350 and/or processing unit(s) 2320 may include memory stores (e.g., cache or the like) for the implementation of an image buffer or the like.

In some examples, video encoder 100 implemented via logic circuitry may include an image buffer (e.g., via either processing unit(s) 2320 or memory store(s) 2304)) and a graphics processing unit (e.g., via processing unit(s) 2320). The graphics processing unit may be communicatively coupled to the image buffer. The graphics processing unit may include video encoder 100 (or encoder 700) as implemented via logic circuitry 2350 to embody the various modules as discussed with respect to FIGS. 1, 3, 5 and 8. For example, the graphics processing unit may include coding partitions generator logic circuitry, adaptive transform logic circuitry, content pre-analyzer, encode controller logic circuitry, adaptive entropy encoder logic circuitry, and so on.

The logic circuitry may be configured to perform the various operations as discussed herein. For example, at the encoder 100, the multi-reference frame storage and frame selector 119 may select reconstructed frames as reference frames for a current frame according to the indexing provided by the dependency logic 128. The morphing and synthesis generators 130 and 132 for out-of-loop reference frame modification may provide the morphing and synthesis parameters so that the in-loop morphing and synthesizing analyzers 120 or 121 will then form the modified reference frames, and the motion estimator 122 then uses the modified reference frames to form motion predictions for the current frame.

In one example, the graphics processing unit of video encoder 100 may be configured to receive data for a sequence of frames of pixel data, where the sequence has a display order, and each frame is associated with a temporal position of the display order. The graphics processing unit may then generate at least one of: (1) a current F-picture using inter-prediction, comprising providing the option to form at least one part of the current F-picture from a previous prediction reference frame, a subsequent prediction reference frame, or both, where previous and subsequent are relative to the position of the current F-picture and within the sequence, and (2) a current P-picture of the sequence of frames using inter-prediction, comprising providing the option to form at least one part of the current P-picture from at least one previous prediction reference frame, wherein previous is relative to the position of the current P-picture and within the sequence. The processing unit may then generate motion data for the part of the at least one current P-picture or F-picture comprising using at least one modified prediction reference frame for generating the motion data for the part of the current P-picture or F-picture, wherein at least one of: (a) the morphing analyzer being configured to use a morphing technique, (b) the synthesizing analyzer being configured to use a synthesizing technique, and both (a) and (b). Video decoder 200 may be implemented in a similar manner.

In some examples, antenna 2302 of video coding system 2300 may be configured to receive an encoded bitstream of video data. As discussed, the encoded bitstream may include data associated with morphing and/or synthesizing parameters and/or other data defining the parts of the P-picture and/or F-picture as explained above. Video coding system 2300 may also include video decoder 200 (or decoder 1800) coupled to antenna 2302 and configured to decode the encoded bitstream.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 24:
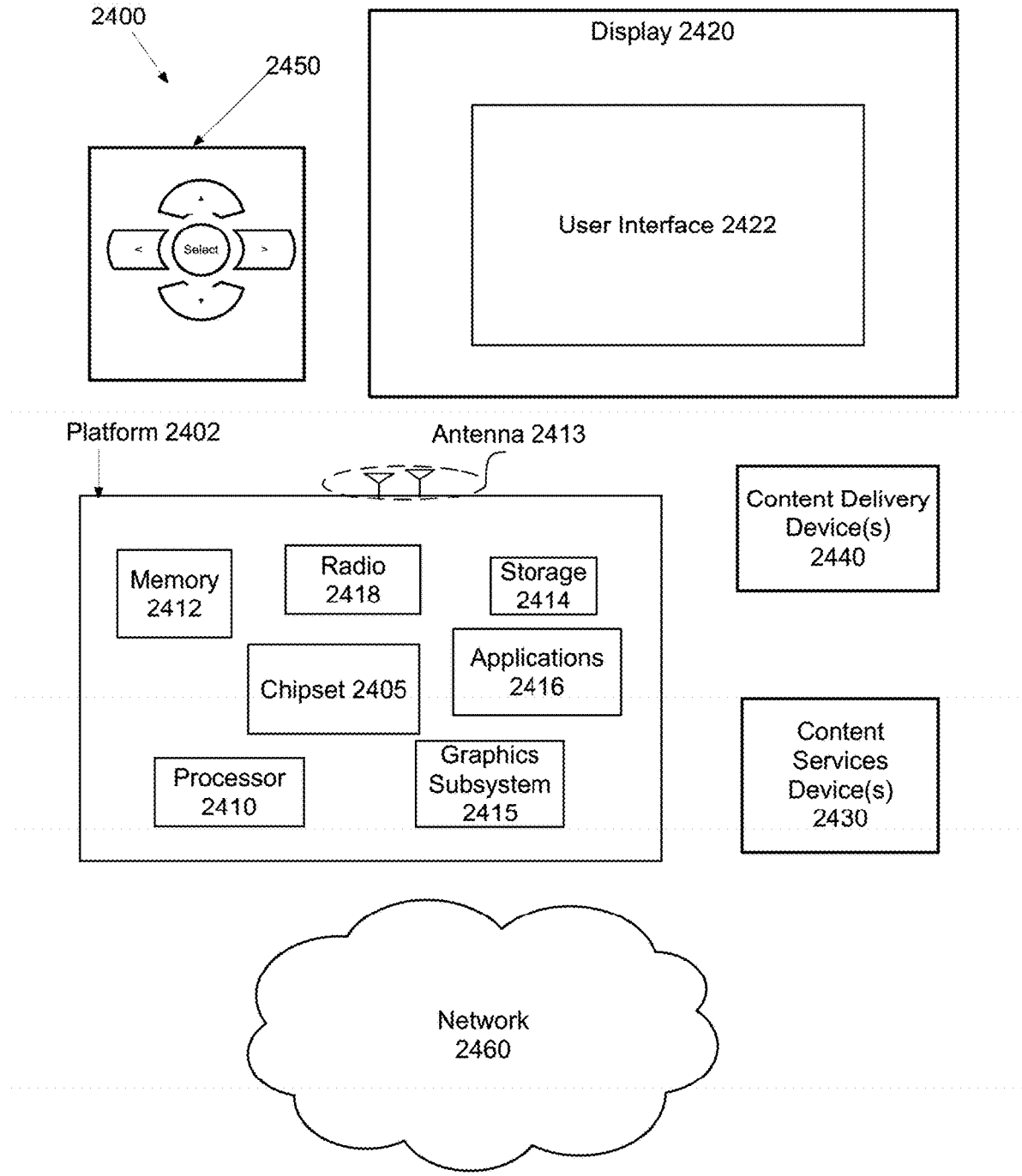
FIG. 24 is an illustrative diagram of an example system.

FIG. 24 is an illustrative diagram of an example system 2400, arranged in accordance with at least some implementations of the present disclosure. In various implementations, system 2400 may be a media system although system 2400 is not limited to this context. For example, system 2400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2400 includes a platform 2402 coupled to a display 2420. Platform 2402 may receive content from a content device such as content services device(s) 2430 or content delivery device(s) 2440 or other similar content sources. A navigation controller 2450 including one or more navigation features may be used to interact with, for example, platform 2402 and/or display 2420. Each of these components is described in greater detail below.

In various implementations, platform 2402 may include any combination of a chipset 2405, processor 2410, memory 2412, antenna 2413, storage 2414, graphics subsystem 2415, applications 2416 and/or radio 2418. Chipset 2405 may provide intercommunication among processor 2410, memory 2412, storage 2414, graphics subsystem 2415, applications 2416 and/or radio 2418. For example, chipset 2405 may include a storage adapter (not depicted) capable of providing intercommunication with storage 2414.

Processor 2410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2410 may be dual-core processor(s), dual-core mobile processor(s), and so forth.

Memory 2412 may be implemented as a volatile memory device such as, but not limited to, a Random Access Memory (RAM), Dynamic Random Access Memory (DRAM), or Static RAM (SRAM).

Storage 2414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2414 may include technology to increase the storage performance enhanced protection for valuable digital media when multiple hard drives are included, for example.

Graphics subsystem 2415 may perform processing of images such as still or video for display. Graphics subsystem 2415 may be a graphics processing unit (GPU) or a visual processing unit (VPU), for example. An analog or digital interface may be used to communicatively couple graphics subsystem 2415 and display 2420. For example, the interface may be any of a High-Definition Multimedia Interface, DisplayPort, wireless HDMI, and/or wireless HD compliant techniques. Graphics subsystem 2415 may be integrated into processor 2410 or chipset 2405. In some implementations, graphics subsystem 2415 may be a stand-alone device communicatively coupled to chipset 2405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2418 may operate in accordance with one or more applicable standards in any version.

In various implementations, display 2420 may include any television type monitor or display. Display 2420 may include, for example, a computer display screen, touch screen display, video monitor, television-like device, and/or a television. Display 2420 may be digital and/or analog. In various implementations, display 2420 may be a holographic display. Also, display 2420 may be a transparent surface that may receive a visual projection. Such projections may convey various forms of information, images, and/or objects. For example, such projections may be a visual overlay for a mobile augmented reality (MAR) application. Under the control of one or more software applications 2416, platform 2402 may display user interface 2422 on display 2420.

In various implementations, content services device(s) 2430 may be hosted by any national, international and/or independent service and thus accessible to platform 2402 via the Internet, for example. Content services device(s) 2430 may be coupled to platform 2402 and/or to display 2420. Platform 2402 and/or content services device(s) 2430 may be coupled to a network 2460 to communicate (e.g., send and/or receive) media information to and from network 2460. Content delivery device(s) 2440 also may be coupled to platform 2402 and/or to display 2420.

In various implementations, content services device(s) 2430 may include a cable television box, personal computer, network, telephone, Internet enabled devices or appliance capable of delivering digital information and/or content, and any other similar device capable of unidirectionally or bidirectionally communicating content between content providers and platform 2402 and/display 2420, via network 2460 or directly. It will be appreciated that the content may be communicated unidirectionally and/or bidirectionally to and from any one of the components in system 2400 and a content provider via network 2460. Examples of content may include any media information including, for example, video, music, medical and gaming information, and so forth.

Content services device(s) 2430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2402 may receive control signals from navigation controller 2450 having one or more navigation features. The navigation features of controller 2450 may be used to interact with user interface 2422, for example. In various embodiments, navigation controller 2450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2450 may be replicated on a display (e.g., display 2420) by movements of a pointer, cursor, focus ring, or other visual indicators displayed on the display. For example, under the control of software applications 2416, the navigation features located on navigation controller 2450 may be mapped to virtual navigation features displayed on user interface 2422. In various embodiments, controller 2450 may not be a separate component but may be integrated into platform 2402 and/or display 2420. The present disclosure, however, is not limited to the elements or in the context shown or described herein.

In various implementations, drivers (not shown) may include technology to enable users to instantly turn on and off platform 2402 like a television with the touch of a button after initial boot-up, when enabled, for example. Program logic may allow platform 2402 to stream content to media adaptors or other content services device(s) 2430 or content delivery device(s) 2440 even when the platform is turned "off." In addition, chipset 2405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2400 may be integrated. For example, platform 2402 and content services device(s) 2430 may be integrated, or platform 2402 and content delivery device(s) 2440 may be integrated, or platform 2402, content services device(s) 2430, and content delivery device(s) 2440 may be integrated, for example. In various embodiments, platform 2402 and display 2420 may be an integrated unit. Display 2420 and content service device(s) 2430 may be integrated, or display 2420 and content delivery device(s) 2440 may be integrated, for example. These examples are not meant to limit the present disclosure.

In various embodiments, system 2400 may be implemented as a wireless system, a wired system, or a combination of both. When implemented as a wireless system, system 2400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2400 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 23.

Figure 25:
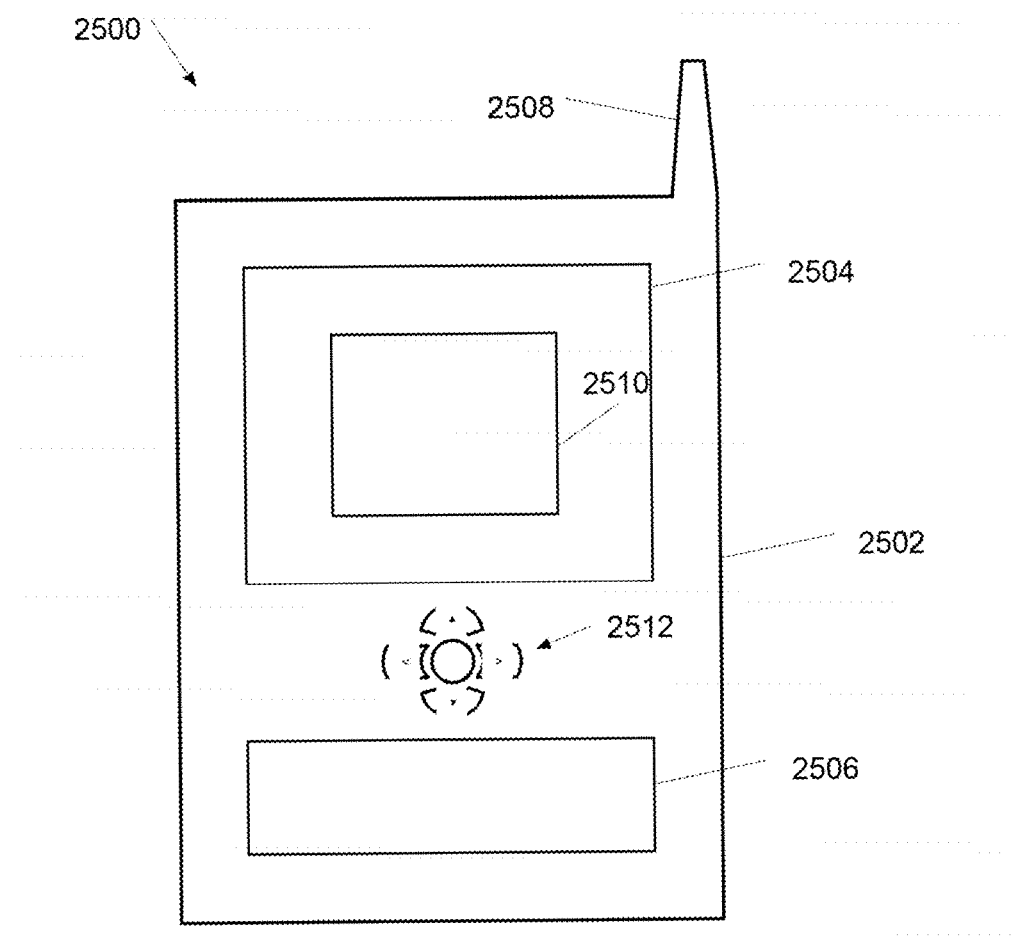
FIG. 25 illustrates an example device, all arranged in accordance with at least some implementations of the present disclosure.

As described above, system 2400 may be embodied in varying physical styles or form factors. FIG. 25 illustrates implementations of a small form factor device 2500 in which system 2500 may be embodied. In various embodiments, for example, device 2500 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 25, device 2500 may include a housing 2502, a display 2504 which may include a user interface 2510, an input/output (I/O) device 2506, and an antenna 2508. Device 2500 also may include navigation features 2512. Display 2504 may include any suitable display unit for displaying information appropriate for a mobile computing device. I/O device 2506 may include any suitable I/O device for entering information into a mobile computing device. Examples for I/O device 2506 may include an alphanumeric keyboard, a numeric keypad, a touch pad, input keys, buttons, switches, rocker switches, microphones, speakers, voice recognition device and software, and so forth. Information also may be entered into device 2400 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. In another form, a non-transitory article, such as a non-transitory machine-readable medium, may be used with any of the examples mentioned above or other examples except that it does not include a transitory signal per se. It does include those elements other than a signal per se that may hold data temporarily in a "transitory" fashion such as RAM and so forth.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

By one implementation, a computer-implemented method for video coding comprises receiving data for a sequence of frames of pixel data, the sequence has a display order, and each frame is associated with a temporal position of the display order. The method also includes generating at least one current F-picture of the sequence of frames using inter-prediction. This may comprise providing the option to form at least one part of the current F-picture from at least one previous prediction reference frame, at least one subsequent prediction reference frame, or both, and where the terms previous and subsequent are relative to the position of the current F-picture and within the sequence. The method includes generating motion data for the part of the at least one current F-picture comprising using at least one modified prediction reference frame for generating the motion data for the part of the current F-picture, and the at least one modified prediction reference frame is modified by using a morphing technique or a synthesizing technique or both.

By another implementation, the method also may include forming the sequence with non-F prediction reference frames used to generate the motion data for the F-pictures, and wherein the F-pictures are spaced between the non-F prediction reference frames, and wherein the number of F-pictures between the non-F prediction reference frames varies along the sequence. This method may include generating at least one P-picture within the sequence by providing an option to generate at least part of the P-picture from at least one of multiple previous prediction reference frames along the sequence, as well as providing the option to form at least one of the F-pictures from at least one additional prediction reference frame in addition to one previous prediction reference frame and one subsequent prediction reference frame along the sequence and relative to the position of the F-picture. The method may comprise at least one of: (1) the F-picture being formed by selecting the best result of a plurality of results from a plurality of reference frames provided to at least partially form the F-picture in an inter-mode, and (2) the F-picture being formed by using data of a plurality of reference frames used to contribute to a result to at least partially form the F-picture in a multi-mode. The method may also comprise at least one of: (1) using at least one F-picture as a prediction reference frame for another F-picture, (2) forming a continuous or non-continuous chain of reference frames along the sequence so that a plurality of F-pictures are reference frames to one next subsequent F-picture, where the chain of references is provided in addition to any other reference frames for at least one of the F-pictures, and (3) using a pyramid reference frame structure where a reference F-picture has a previous reference frame and a subsequent reference frame along the sequence and is itself a reference frame to another F-picture. The method may also comprise at least one of: (1) a synthesizing technique that comprises projected interpolation wherein a projected interpolation frame or frame part is formed in place of the current F-picture for prediction, and by weighting data of two reference frames depending on a temporal distance along the sequence and from the two reference frames relative to the position of the current F-picture, and (2) a synthesizing technique that comprises modifying the resolution of a frame. The morphing technique may comprise a modified reference frame modified from another reference frame of at least one of: (1) blur compensation, (2) registration compensation, (3) global motion compensation, (4) dominant motion compensation, (5) luminance gain compensation, and all of (1) to (5). In one form, the modified prediction reference frame is used for prediction but is not displayed.

In yet another implementation, a computer-implemented method for video coding, comprises receiving data for a sequence of frames of pixel data, the sequence having a display order, and wherein each frame is associated with a temporal position of the display order, generating at least one current P-picture of the sequence of frames using inter-prediction, comprising providing the option to form at least one part of the current P-picture from at least one previous prediction reference frame, wherein previous is relative to the position of the current P-picture and within the sequence, and generating motion data for the part of the at least one current P-picture comprising using at least one modified prediction reference frame for generating the motion data for the part of the current P-picture, and the at least one modified prediction reference frame being modified by using a morphing technique or a synthesizing technique or both.

Such a method may also include generating at least one P-picture within the sequence by providing an option to generate at least part of the P-picture from at least one of multiple previous prediction reference frames along the sequence, and may include at least one of: (1) the P-picture being formed by selecting the best result of a plurality of results from a plurality of reference frames provided to at least partially form the P-picture in an inter-mode, and (2) the P-picture being formed by using data of a plurality of reference frames used to contribute to a result to at least partially form the P-picture in a multi-mode. Otherwise, the method may include at least one of: (1) a synthesizing technique that comprises projected interpolation wherein a projected interpolation frame or frame part is formed in place of the current P-picture for prediction, and by weighting data of two reference frames depending on a temporal distance along the sequence relative to the position of the current P-picture, and (2) a synthesizing technique that comprises modifying the resolution of a frame. The method may use a morphing technique that comprises a modified reference frame modified from another reference frame of at least one of: (1) blur compensation, (2) registration compensation, (3) global motion compensation, (4) dominant motion compensation, (5) luminance gain compensation, and all of (1) to (5). In one form, the modified prediction reference frame may be used for prediction but is not displayed.

In a further implementation, a coder comprises an image buffer, and a graphics processing unit communicatively coupled to the image buffer and comprising at least one morphing analyzer or at least one synthesizing analyzer or both. The graphics processing unit is configured to receive data for a sequence of frames of pixel data, the sequence having a display order, and wherein each frame is associated with a temporal position of the display order, and generate at least one of: (1) a current F-picture using inter-prediction, and that comprises providing the option to form at least one part of the current F-picture from a previous prediction reference frame, a subsequent prediction reference frame, or both, wherein previous and subsequent are relative to the position of the current F-picture and within the sequence, and (2) a current P-picture of the sequence of frames using inter-prediction, and that comprises providing the option to form at least one part of the current P-picture from at least one previous prediction reference frame, wherein previous is relative to the position of the current P-picture and within the sequence. The graphics unit may also be configured to generate motion data for the part of the at least one current P-picture or F-picture and that comprises using at least one modified prediction reference frame for generating the motion data for the part of the current P-picture or F-picture. This may include at least one of: the morphing analyzer being configured to use a morphing technique, the synthesizing analyzer being configured to use a synthesizing technique, and both.

In another implementation for this coder, the sequence comprises non-F prediction reference frames used to generate the motion data for the F-pictures, and wherein the F-pictures are spaced between the non-F prediction reference frames, and wherein the number of F-pictures between the non-F prediction reference frames varies along the sequence. The sequence may include at least one P-picture within the sequence formed by providing an option to generate at least part of the P-picture from at least one of multiple previous prediction reference frames along the sequence. The sequence may also comprise at least one F-picture of the sequence being formed by providing the option to form at least part of the F-picture from at least one additional prediction reference frame in addition to one previous prediction reference frame, one subsequent prediction reference frame, or both along the sequence and relative to the position of the F-picture. The sequence may have at least one of: (1) the P-picture or F-picture is formed by selecting the best result of a plurality of results from a plurality of reference frames provided to at least partially form the P-picture or F-picture in an inter-mode, and (2) wherein the P-picture or F-picture is formed by using data of a plurality of reference frames used to contribute to a result to at least partially form the P-picture or F-picture in a multi-mode. In one form, the sequence comprises at least one of: (1) at least one F-picture is a prediction reference frame for another F-picture, (2) a continuous or non-continuous chain of reference frames along the sequence so that a plurality of F-pictures are reference frames to one next subsequent F-picture, wherein the chain of references is provided in addition to any other reference frames for at least one of the F-pictures, and (3) a pyramid reference frame structure wherein a reference F-picture has a previous reference frame and a subsequent reference frame along the sequence and is itself a reference frame to another F-picture. The synthesizing technique comprises at least one of: (1) projected interpolation wherein a projected interpolation frame or frame part is formed in place of the current F-picture for prediction, and by weighting data of two reference frames depending on a temporal distance along the sequence relative to the position of the current F-picture, and (2) super resolution frame with a frame with a modified resolution. The morphing technique comprises a modified reference frame modified from another reference frame of at least one of: (1) blur, (2) registration, (3) global motion, (4) dominant motion, (5) gain in luminance, and all of (1) to (5). In one example, the modified prediction reference frame is used for prediction but is not displayed. The coder may also include at least one morphing analyzer or synthesizing analyzer in a decoder loop to reconstruct frames, and at least one morphing analyzer or synthesizing analyzer out of the decoding loop to generate data for motion estimation based on original non-decoded image data.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method for video coding, comprising:
    receiving data for a sequence of frames of pixel data, the sequence having a display order, and wherein each frame is associated with a temporal position of the display order;
    generating at least one current F-picture of the sequence of frames using inter-prediction, comprising providing all three options to form (1) at least one part of the current F-picture from at least one previous prediction reference frame without using subsequent prediction reference frames, (2) at least one subsequent prediction reference frame without using previous prediction reference frames, or (3) to use both previous and subsequent prediction reference frames, wherein previous and subsequent are relative to the position of the current F-picture and within the sequence, wherein the option to select among the three choices is not available for B-pictures; and
    generating motion data for the part of the at least one current F-picture comprising using at least one modified prediction reference frame for generating the motion data for the part of the current F-picture, and the at least one modified prediction reference frame being modified by using a morphing technique or a synthesizing technique or both comprising analyzing a current F-picture to determine parameters of the at least one modified prediction reference frame and to decide which of the techniques to use as part of a selected prediction mode of the current F-picture, and depending, at least in part, on the data of the current F-picture, wherein at least one morphing technique or synthesizing technique is available for the F-picture but is not available for B-pictures.

2. The method of claim 1 comprising forming the sequence with non-F prediction reference frames used to generate the motion data for the F-pictures, and wherein the F-pictures are spaced between the non-F prediction reference frames, and wherein the number of F-pictures between the non-F prediction reference frames varies along the sequence.

3. The method of claim 1 comprising generating at least one P-picture within the sequence by providing an option to generate at least part of the P-picture from at least one of multiple previous prediction reference frames along the sequence.

4. The method of claim 1 comprising providing the option to form at least one of the F-pictures from at least one additional prediction reference frame in addition to one previous prediction reference frame and one subsequent prediction reference frame along the sequence and relative to the position of the F-picture.

5. The method of claim 1 wherein the F-picture is formed by selecting the best result of a plurality of results from a plurality of reference frames provided to at least partially form the F-picture in an inter-mode.

6. The method of claim 1 wherein the F-picture is formed by using data of a plurality of reference frames used to contribute to a result to at least partially form the F-picture in a multi-mode.

7. The method of claim 1 comprising using at least one F-picture as a prediction reference frame for another F-picture.

8. The method of claim 1 comprising forming a continuous or non-continuous chain of reference frames along the sequence so that a plurality of F-pictures are reference frames to one next subsequent F-picture.

9. The method of claim 8 wherein the chain of references is provided in addition to any other reference frames for at least one of the F-pictures.

10. The method of claim 1 comprising using a pyramid reference frame structure wherein a reference F-picture has a previous reference frame and a subsequent reference frame along the sequence and is itself a reference frame to another F-picture.

11. The method of claim 1 wherein a synthesizing technique comprises projected interpolation wherein a projected interpolation frame or frame part is formed in place of the current F-picture for prediction, and by weighting data of two reference frames depending on a temporal distance along the sequence relative to the position of the current F-picture.

12. The method of claim 1 wherein a synthesizing technique comprises modifying the resolution of a frame.

13. The method of claim 1 wherein morphing technique comprises a modified reference frame modified from another reference frame of at least one of:
(1) blur compensation,
(2) registration compensation,
(3) global motion compensation
(4) dominant motion compensation,
(5) luminance gain compensation, and
all of (1) to (5).

14. The method of claim 1 wherein the modified prediction reference frame is used for prediction but is not displayed.

15. The method of claim 1, comprising:
forming the sequence with non-F prediction reference frames used to generate the motion data for the F-pictures, and wherein the F-pictures are spaced between the non-F prediction reference frames, and wherein the number of F-pictures between the non-F prediction reference frames varies along the sequence;
generating at least one P-picture within the sequence by providing an option to generate at least part of the P-picture from at least one of multiple previous prediction reference frames along the sequence;
providing the option to form at least one of the F-pictures from at least one additional prediction reference frame in addition to one previous prediction reference frame and one subsequent prediction reference frame along the sequence and relative to the position of the F-picture;
wherein at least one of:
the F-picture is formed by selecting the best result of a plurality of results from a plurality of reference frames provided to at least partially form the F-picture in an inter-mode, and
the F-picture is formed by using data of a plurality of reference frames used to contribute to a result to at least partially form the F-picture in a multi-mode;
comprising at least one of:
using at least one F-picture as a prediction reference frame for another F-picture;
forming a continuous or non-continuous chain of reference frames along the sequence so that a plurality of F-pictures are reference frames to one next subsequent F-picture; wherein the chain of references is provided in addition to any other reference frames for at least one of the F-pictures;
using a pyramid reference frame structure wherein a reference F-picture has a previous reference frame and a subsequent reference frame along the sequence and is itself a reference frame to another F-picture;
wherein at least one of:
a synthesizing technique comprises projected interpolation wherein a projected interpolation frame or frame part is formed in place of the current F-picture for prediction, and by weighting data of two reference frames depending on a temporal distance along the sequence relative to the position of the current F-picture;
a synthesizing technique comprises modifying the resolution of a frame;
wherein a morphing technique comprises a modified reference frame modified from another reference frame of at least one of:
(1) blur compensation,
(2) registration compensation,
(3) global motion compensation,
(4) dominant motion compensation,
(5) luminance gain compensation, and
all of (1) to (5); and
wherein the modified prediction reference frame is used for prediction but is not displayed.

16. The computer-implemented method of claim 1, comprising:
generating at least one current P-picture of the sequence of frames using inter-prediction, comprising providing the option to form at least one part of the current P-picture from at least one previous prediction reference frame, wherein previous is relative to the position of the current P-picture and within the sequence; and
generating motion data for the part of the at least one current P-picture comprising using at least one modified prediction reference frame for generating the motion data for the part of the current P-picture, and the at least one modified prediction reference frame being modified by using a morphing technique or a synthesizing technique or both comprising analyzing a current P-picture to determine parameters of the at least one modified prediction reference frame and to decide which of the techniques to use as part of a selected prediction mode of the current P-picture, and depending, at least in part, on the data of the current P-picture,
wherein at least one morphing technique or synthesizing technique is available for the P-picture but is not available for B-pictures.

17. The method of claim 16, comprising:
generating at least one P-picture within the sequence by providing an option to generate at least part of the P-picture from at least one of multiple previous prediction reference frames along the sequence;
wherein at least one of:
the P-picture is formed by selecting the best result of a plurality of results from a plurality of reference frames provided to at least partially form the P-picture in an inter-mode, and
the P-picture is formed by using data of a plurality of reference frames used to contribute to a result to at least partially form the P-picture in a multi-mode;
wherein at least one of:
a synthesizing technique comprises projected interpolation wherein a projected interpolation frame or frame part is formed in place of the current P-picture for prediction, and by weighting data of two reference frames depending on a temporal distance along the sequence relative to the position of the current P-picture;
a synthesizing technique comprises modifying the resolution of a frame;
wherein a morphing technique comprises a modified reference frame modified from another reference frame of at least one of:
(1) blur compensation,
(2) registration compensation,
(3) global motion compensation,
(4) dominant motion compensation,
(5) luminance gain compensation, and
all of (1) to (5); and
wherein the modified prediction reference frame is used for prediction but is not displayed.

18. A coder, comprising:
an image buffer;
a graphics processing unit communicatively coupled to the image buffer and comprising at least one morphing analyzer or at least one synthesizing analyzer or both, the graphics processing unit being configured to:

receive data for a sequence of frames of pixel data, the sequence having a display order, and wherein each frame is associated with a temporal position of the display order;

generate at least one of:
a current F-picture using inter-prediction, comprising providing all three options the option to form (1) at least one part of the current F-picture from at least one previous prediction reference frame without using subsequent prediction reference frames, (2) at least one subsequent prediction reference frame without using previous prediction reference frames, or (3) to use both previous and subsequent prediction reference frames, wherein previous and subsequent are relative to the position of the current F-picture and within the sequence, wherein the option to select among the three choices is not available for B-pictures, and a current P-picture of the sequence of frames using inter-prediction, comprising providing the option to form at least one part of the current P-picture from at least one previous prediction reference frame, wherein previous is relative to the position of the current P-picture and within the sequence; and generate motion data for the part of the at least one current P-picture or F-picture comprising using at least one modified prediction reference frame for generating the motion data for the part of the current P-picture or F-picture, wherein at least one of:
the morphing analyzer being configured to use a morphing technique,
the synthesizing analyzer being configured to use a synthesizing technique, and
both, and
comprising analyzing a current F-picture or P-picture to determine parameters of the at least one modified prediction reference frame and to decide which technique to use as part of a selected prediction mode of the current F-picture, and depending, at least in part, on the data of the current F-picture,
wherein at least one morphing technique or synthesizing technique is available for the P-picture and F-picture but is not available for B-pictures.

19. The coder of claim 18 wherein a synthesizing technique comprises at least one of:
projected interpolation wherein a projected interpolation frame or frame part is formed in place of the current F-picture for prediction, and by weighting data of two reference frames depending on a temporal distance along the sequence relative to the position of the current F-picture, and
modifying the resolution of a frame,
wherein morphing technique comprises a modified reference frame modified from another reference frame of at least one of:
(1) blur,
(2) registration,
(3) global motion,
(4) dominant motion,
(5) gain in luminance, and
all of (1) to (5);
the coder comprising at least one morphing analyzer or synthesizing analyzer in a decoder loop to reconstruct frames, and at least one morphing analyzer or synthesizing analyzer out of the decoding loop to generate data for motion estimation based on original non-decoded image data.

20. The coder of claim 18,
wherein the sequence comprises non-F prediction reference frames used to generate the motion data for the F-pictures, and wherein the F-pictures are spaced between the non-F prediction reference frames, and wherein the number of F-pictures between the non-F prediction reference frames varies along the sequence;
comprising at least one P-picture within the sequence formed by providing an option to generate at least part of the P-picture from at least one of multiple previous prediction reference frames along the sequence;
comprising at least one F-picture of the sequence being formed by providing the option to form at least part of the F-picture from at least one additional prediction reference frame in addition to one previous prediction reference frame, one subsequent prediction reference frame, or both along the sequence and relative to the position of the F-picture;
wherein at least one of:
the P-picture or F-picture is formed by selecting the best result of a plurality of results from a plurality of reference frames provided to at least partially form the P-picture or F-picture in an inter-mode, and
wherein the P-picture or F-picture is formed by using data of a plurality of reference frames used to contribute to a result to at least partially form the P-picture or F-picture in a multi-mode;
the sequence comprising at least one of:
at least one F-picture is a prediction reference frame for another F-picture,
a continuous or non-continuous chain of reference frames along the sequence so that a plurality of F-pictures are reference frames to one next subsequent F-picture, wherein the chain of references is provided in addition to any other reference frames for at least one of the F-pictures, and
a pyramid reference frame structure wherein a reference F-picture has a previous reference frame and a subsequent reference frame along the sequence and is itself a reference frame to another F-picture;
wherein a synthesizing technique comprises at least one of:
projected interpolation wherein a projected interpolation frame or frame part is formed in place of the current F-picture for prediction, and by weighting data of two reference frames depending on a temporal distance along the sequence relative to the position of the current F-picture, and
super resolution frame with a frame with a modified resolution;
wherein morphing technique comprises a modified reference frame modified from another reference frame of at least one of:
(1) blur,
(2) registration,
(3) global motion,
(4) dominant motion,
(5) gain in luminance, and
all of (1) to (5);
wherein the modified prediction reference frame is used for prediction but is not displayed; and comprising at least one morphing analyzer or synthesizing analyzer in a decoder loop to reconstruct frames, and at least one morphing analyzer or synthesizing analyzer out of the decoding loop to generate data for motion estimation based on original non-decoded image data.

* * * * *